United States Patent [19]

Yagyu et al.

[11] Patent Number: 5,899,955

[45] Date of Patent: May 4, 1999

[54] METHOD AND APPARATUS FOR SEARCHING A ROUTE

[75] Inventors: Takeshi Yagyu, Osaka; Makoto Fushimi, Katano; Yoshiki Ueyama, Sakai, all of Japan

[73] Assignee: Matsushita Electric Industrial Co., Ltd., Osaka-Fu, Japan

[21] Appl. No.: 08/774,322

[22] Filed: Dec. 24, 1996

[30] Foreign Application Priority Data

Dec. 28, 1995 [JP] Japan ................................. 7-343819

[51] Int. Cl.$^6$ ....................................................... G06G 7/78
[52] U.S. Cl. ........................ 701/209; 701/207; 701/212; 340/988; 73/178 R
[58] Field of Search ..................................... 701/200, 201, 701/202, 208, 209, 210, 25, 23, 211, 212, 213; 340/460, 988, 990, 995; 73/178 R

[56] References Cited

U.S. PATENT DOCUMENTS

| | | | |
|---|---|---|---|
| 5,031,104 | 7/1991 | Ikeda et al. | 701/209 |
| 5,168,452 | 12/1992 | Yamada et al. | 701/202 |
| 5,285,391 | 2/1994 | Smith, Jr. et al. | 701/200 |
| 5,475,387 | 12/1995 | Matsumoto | 340/990 |
| 5,475,598 | 12/1995 | Fushimi et al. | 701/202 |
| 5,502,640 | 3/1996 | Yagyu et al. | 701/200 |
| 5,513,110 | 4/1996 | Fujita et al. | 701/207 |
| 5,521,826 | 5/1996 | Matsumoto | 701/208 |
| 5,684,704 | 11/1997 | Okazaki | 701/201 |
| 5,712,632 | 1/1998 | Nishimura et al. | 701/201 |

FOREIGN PATENT DOCUMENTS

| | | |
|---|---|---|
| 346 492 | 12/1989 | European Pat. Off. . |
| 372 840 | 6/1990 | European Pat. Off. . |
| 575 943 | 12/1993 | European Pat. Off. . |
| 59-105113 | 6/1984 | Japan . |
| 2-56591 | 2/1990 | Japan . |
| 3-54590 | 3/1991 | Japan . |
| 5-27679 | 2/1993 | Japan . |
| 5-323870 | 12/1993 | Japan . |
| 93/0452 | 2/1993 | WIPO . |

OTHER PUBLICATIONS

Yilin Zhao and Terry E. Weymouth, "An Adaptive Route–Guidance Algorithm for Intelligent Vehicle Highway Systems", Proceeding of the American Control Conference, Bost, Jun. 26–28, 1991, vol. 3,26, pp. 2568–2573.

Aho, Alfred V. *Data Structures and Algorithms* Trnas. Yoshio Ono. Kabushiki Kaisha Baifu–kan, 1990, pp. 179–183.

*Primary Examiner*—Jacques H. Louis-Jacques
*Attorney, Agent, or Firm*—Wenderoth, Lind & Ponack, L.L.P.

[57] ABSTRACT

An optimum route searching device 5 conducts a search in a predetermined area on road network data on a lower hierarchical level to obtain minimum arrival costs to individual nodes in the search area and then selects a node located on an upper hierarchical level existing in from the search area. Then the optimum route searching device 5 obtains a remaining cost to a node common with the upper hierarchical level which first appears on the upper hierarchical level existing link. Then the optimum route searching device 5 obtains a minimum arrival cost from the starting point of the search to the common node on the basis of the minimum arrival cost to the selected node and the remaining cost to the common node. The minimum arrival cost to the common node obtained at this time is used as initial conditions for a route search performed on the road network data on the upper hierarchical level. This makes it possible to shift the search results on the lower hierarchical level to the upper hierarchical level without causing an abnormal route such as a U-turn path and a bypass path.

12 Claims, 19 Drawing Sheets

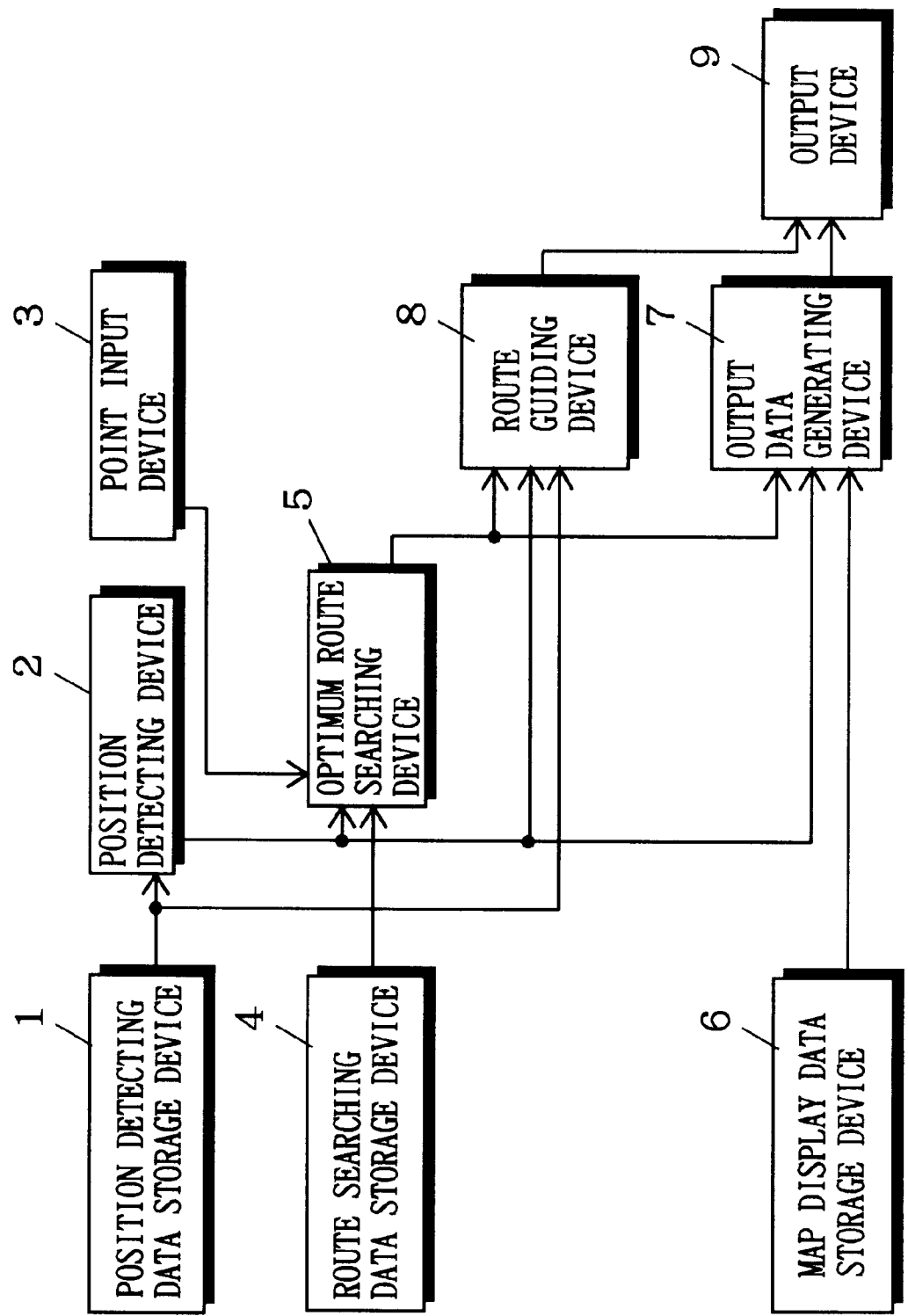

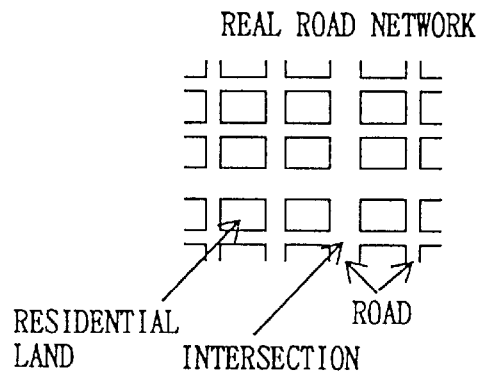
FIG. 2(A)
REAL ROAD NETWORK
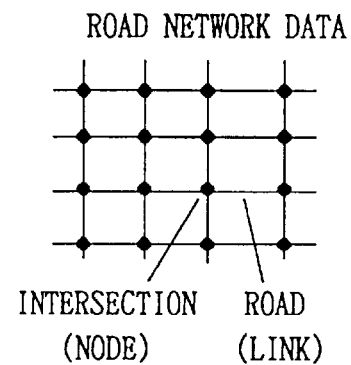
FIG. 2(B)
ROAD NETWORK DATA
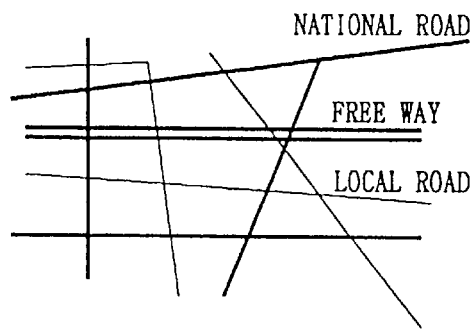
FIG. 3(A)
ALL ROAD NETWORK
(HIERARCHICAL LEVEL $\alpha 0$)
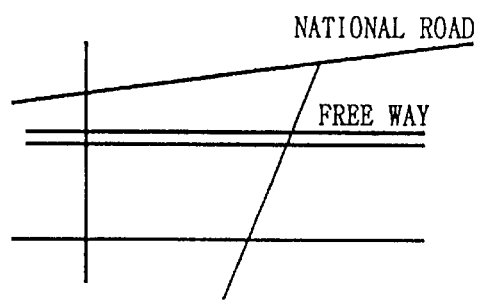
FIG. 3(B)
MAIN ROAD NETWORK
(HIERARCHICAL LEVEL $\alpha 1$)
FIG. 3(C) HIERARCHICAL STRUCTURE
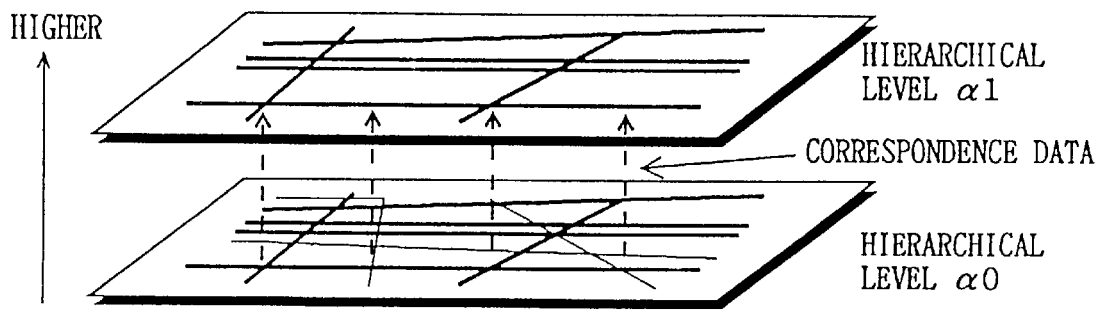

INTERSECTIONS AND REMAINING DISTANCES

CORRESPONDENCE DATA

| OBJECT NODE | PARENT LINK | SHARE |
|---|---|---|
| n 1 | R 1 | 8 0 % |
| n 2 | R 1 | 6 0 % |
| n 3 | R 1 | 3 0 % |
| n 4 | R 1 | 1 5 % |
| n 5 | R 1 | 0 % |
| : | : | : |
| n 1 2 | R 6 | 3 4 % |
| : | : | : |
| n 3 2 | R 1 0 | 5 2 % |
| : | : | : |

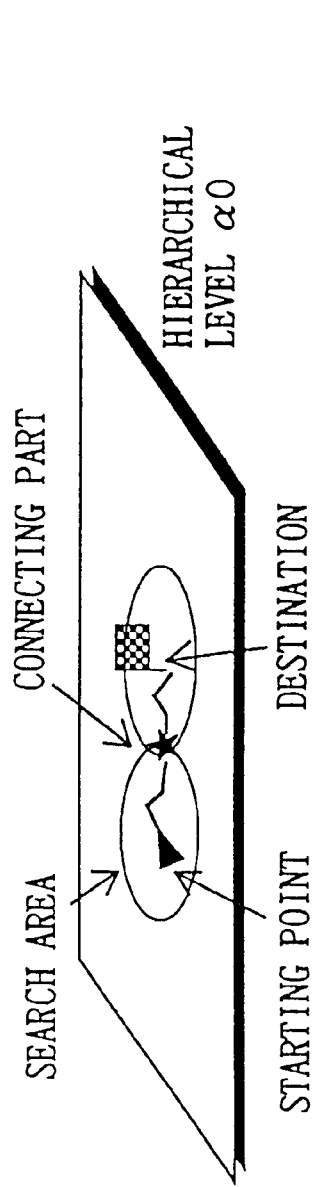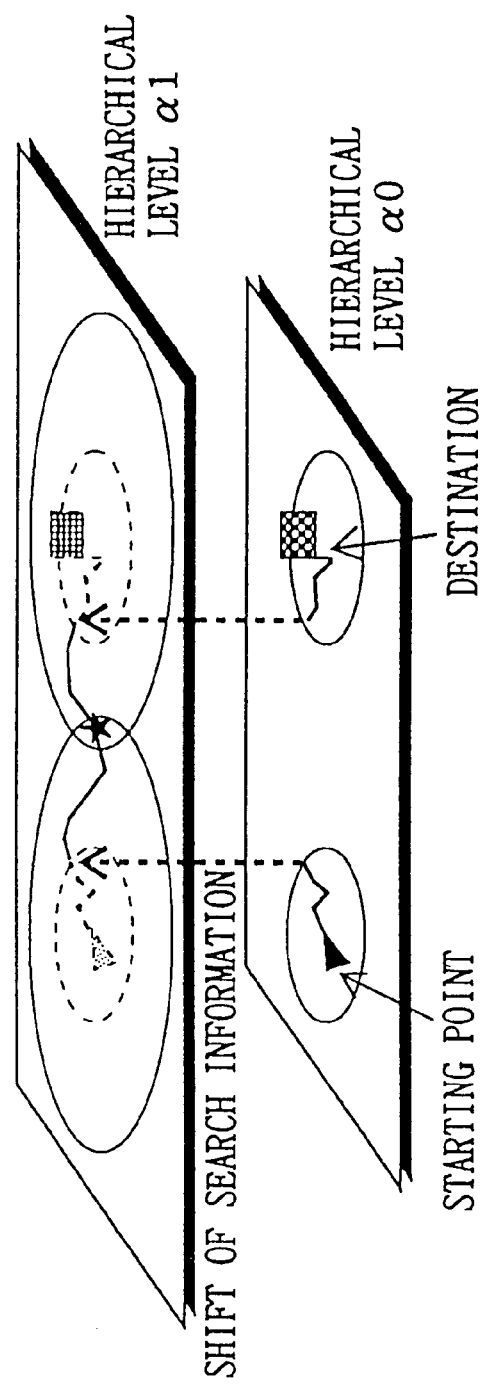

CORRESPONDENCE DATA

| OBJECT NODE | PARENT LINK | SHARE |
|---|---|---|
| : | : | : |
| n 3 | R 5 | 8 0 % |
| n 4 | R 5 | 6 0 % |
| n 5 | R 5 | 3 0 % |
| n 6 | R 5 | 1 0 % |
| : | : | : |

FIG. 8(C)  ROAD NETWORK DATA (PART)

| LINK | NODE 1 | NODE 2 | TRAVEL TIME | ... |
|---|---|---|---|---|
| : | : | : | : | : |
| R 5 | N 5 | N 6 | 1 0 min | ... |
| : | : | : | : | : |

HIERARCHICAL LEVEL $\alpha 0$

HIERARCHICAL LEVEL $\alpha 1$

HIERARCHICAL LEVEL $\alpha 0$

HIERARCHICAL LEVEL $\alpha 1$

HIERARCHICAL LEVEL $\alpha 0$

HIERARCHICAL LEVEL $\alpha 1$

METHOD AND APPARATUS FOR SEARCHING A ROUTE

BACKGROUND OF THE INVENTION

1. Field of the Invention

The present invention relates to route searching methods and apparatus, and more particularly to a method and an apparatus for automatically selecting the most suitable route between a point of departure and a destination specified on a map.

2. Description of the Background Art

In recent years, with the development of electronics, the navigation apparatus for guiding vehicles have spread rapidly. Some conventional navigation apparatus are equipped with a route searching apparatus for automatically selecting the most suitable route from a starting point to a destination (the shortest distance route or the minimum time route.)

In the conventional route searching apparatus, methods for obtaining the most suitable route for guiding vehicles include the automatic vehicle guiding method disclosed in Japanese Patent Laying-Open No. 59-105113 (referred to as a first conventional art, hereinafter), for example. This first conventional art obtains the most suitable route between a starting point and a destination by using the Dijkstra method, one of the optimum route determining methods, from road network data representative of a network of roads. The theory of the Dijkstra method is described in "Data Structures and Algorithms" written by A. V. Aho et al. and translated by Yoshio Ono, Kabushiki Kaisha Baihu-kan, 1990, pp. 179–183, for example.

When searching for the most suitable route between arbitrary two points on a network of roads according to the first conventional art, the time for obtaining the route increases as the numbers of intersections and roads included in the road network increase. As a result, a user must wait for a longer time (e.g., about two or three minutes), which leads to inconvenience.

Hence, in order to reduce the calculating time, the so-called hierarchical route searching method is proposed in which the optimum route is obtained using map data having such a hierarchical structure as shown in FIG. 21. Such a hierarchical route searching method is disclosed in Japanese Patent Laying-Open No. 2-56591 (referred to as a second conventional art hereinafter) and Japanese Patent Laying-Open No. 3-54590 (referred to as a third conventional art hereinafter), for example. In these second and third conventional arts, as shown in FIG. 22, the lower hierarchical level α0 recording a detailed network of roads is searched and then the evaluation values which are used to search for the route, i.e., the costs (distance or travel time), are moved to the upper hierarchical level α1 having a rough network of roads by using common intersections recorded also an the upper hierarchical level α1. That is to say, the second and third conventional arts select the route by using detailed road network data in the vicinities of the starting point and the destination and by using thinned-out rough road network data (e.g., road network data excluding general roads other than national roads and free ways) in other regions.

The second and third conventional arts prepare data for showing cor respondence of common intersections which exist both in the upper and lower hierarchical road networks at the same positions. When shifting the search from the detailed road network data to the rough road network data, as shown in FIG. 23, the search is continued on the upper hierarchical level using the common intersection as a starting point for the search on the rough road network.

However, if the area searched on the detailed road network includes no intersections in common with the rough read network on the true most suitable route from the starting point to the destination, the selected route passes a common intersection deviated from the true most suitable route, as shown in FIG. 24. Accordingly, an abnormal route (a U-turn route or a bypass route) takes place in the vicinity of the intersection.

Accordingly, Japanese Patent Laying-Open No. 5-323870 (hereinafter referred to as a fourth conventional art) discloses the method in which the number of intersections used to shift the route search from the lower hierarchical level is increased on the upper hierarchical level road network data to prevent such an abnormal route (U-turn route or bypass route) as may take place in the second and third conventional arts. That is to say, in this fourth conventional art, intersections which exist on the detailed road network but appear merely as certain points on the roads on the rough road network can be used when shifting the searched road network data. That is to say, virtual intersections are provided on the roads on the rough road network at the same positions as the intersections on the detailed road network from which the search is shifted.

However, when setting such intersections for shifting the hierarchical level on the true most suitable route, it is not sufficient lo add a few intersections on the roads in the rough road network. As shown in FIG. 25, this requires that at least a dozen or so of intersections existing in its vicinity should be added. Accordingly, the number of intersections and the number of roads increase when searching the rough road network, resulting in an increase of the searching time.

Furthermore, the rough road network generally records rough configurations of roads to search a larger area than the detailed road network. Accordingly, precise positions can rot be obtained on the roads in the rough road network on the basis of the positions of intersections on the detailed road network. Hence, the fourth conventional art has the problem that the arrival cost from a halfway point on a road to the next intersection can not be correctly obtained on the rough road network and thus the correct most suitable route can not be obtained.

SUMMARY OF THE INVENTION

Accordingly, an object of the present invention is to provide a route searching method and a route searching apparatus which can obtain the most suitable route excluding a U-turn route or a bypass route when obtaining the most suitable route between two points using hierarchical map data.

It is another object of the present invention is to provide a route searching method and a route searching apparatus with the least increase of search time and a less amount of data recorded.

The present invention has the following features to achieve the objects above.

A first aspect of the present invention relates to a method for selecting an optimum route on a map by using map data including a hierarchical structure of a plurality of road network data at different degrees of minuteness:

wherein the plurality of road network data are hierarchically structured in such a way that the degree of minuteness becomes lower from a lower hierarchical level to an upper hierarchical level, and correspondence data showing correspondence with the road network data on the upper hierarchical level is previously recorded for the road network data on the lower hierarchy level, the route searching method comprising;
a first step of obtaining minimum arrival costs (the cost means a distance or a travel time) from a starting point of a search about individual nodes existing in a predetermined search area from the starting point of the search on the road network data on the lower hierarchical level,
a second step of selecting a node located on a link existing on the road network data on the upper hierarchical level (hereinafter referred to as an upper hierarchical level existing link) on the basis of the correspondence data from among the nodes for which the minimum arrival costs have been obtained in the first step,
a third step of obtaining an arrival cost to a node common with the upper hierarchical level which first appears when following the upper hierarchical level existing link on the basis of the correspondence data for each node selected in the second step, and
a fourth step of obtaining a minimum arrival cost from the search starting point to each common node on the basis of the minimum arrival cost to the selected node obtained in the first step and the arrival cost to the common node obtained in the second step,
wherein the optimum route is newly searched for on the road network data on the upper hierarchical level using the minimum arrival costs to the individual common nodes obtained in the fourth step as initial conditions.

As stated above, in the first aspect, after searching in a predetermined area on the road network data on a lower hierarchical level, the nodes located on the upper hierarchical level existing links are selected and the minimum arrival costs to nodes common with the upper hierarchical level which first appear on the upper hierarchical level existing links are obtained. Therefore, the search results can be shifted to the road network data of the upper hierarchical level without causing an abnormal route such as a U-turn route and a bypass route. Furthermore, according to the first aspect, it is not necessary to have virtual common nodes with the road network data of the lower hierarchical level in the road network data of the upper hierarchical level, which reduces the amount of recorded data and enables higher speed route searching.

According to a second aspect, in the first aspect,
the correspondence data includes;
first correspondence data showing that a node included in the road network data on the lower hierarchical level is a node located on the upper hierarchical level existing link, and
second correspondence data showing the position on the corresponding upper hierarchical level existing link for the node located on the upper hierarchical level existing link,
wherein the second step selects the node located on the upper hierarchical level existing link on the basis of the first correspondence data, and
the third step obtains the arrival cost to the common node on the basis of the second correspondence data.

As stated above, according to the second aspect, for a node located on the upper hierarchical level existing link, second correspondence data showing the position on the corresponding upper hierarchical level existing link is recorded and the arrival cost to the common node is obtained on the basis of the second correspondence data. Therefore the arrival cost can be obtained more correctly as compared with the case in which the remaining cost to the node on the road network data on the upper hierarchical level is estimated using the coordinates of the nodes and configurations of the roads.

According to a third aspect, in the second aspect,
the first correspondence data includes parent link data for specifying a corresponding upper hierarchical level existing link.

According to a fourth aspect, in the second aspect,
the second correspondence data includes a ratio of occupation of the arrival cost from the node located on the upper hierarchical level existing link to a node at an end of the corresponding upper hierarchical level existing link in the cost of the entirety of the corresponding upper hierarchical level existing link.

As stated above, according to the fourth aspect, the ratio of occupation of the arrival cost from a node located on an upper hierarchical level existing link to a node at an end of the corresponding upper hierarchical level existing link with respect to the cost of the entirety of the corresponding upper hierarchical level existing link is used as the second correspondence data. Accordingly, even if coordinates of the nodes and configurations of the links are inaccurate, the remaining cost to the common node can be correctly obtained in a short time by multiplying the ratio by the entire cost of the upper hierarchical level existing link. When the cost of the entire upper hierarchical level existing link is described in the form of distance, the arrival cost can be obtained as a distance, and when it is described in the form of travel time, the arrival cost can be obtained as a travel time. Therefore the present aspect has flexible adaptability in any cases regardless of whether the route search is performed with the distance having priority or with the travel time having priority.

According to a fifth aspect, in the second aspect,
the second correspondence data includes an arrival cost from the node located on the upper hierarchical level existing link to a node at an end of the corresponding upper hierarchical level existing link.

As stated above, according to the fifth aspect, the arrival cost from a node positioned on an upper hierarchical level existing link to a node at an end of the corresponding upper hierarchical level existing link is used as the second correspondence data and hence it is possible to obtain the remaining cost to the common node without any operation.

According to a sixth aspect, in the second aspect,
the second step selects a node located on the upper hierarchical level existing link and located in the vicinity of the search area from among the nodes for which the minimum arrival costs have been obtained in the first step.

As stated above, according to the sixth aspect, the nodes in the road network data on the lower hierarchical level used to obtain the arrival costs to the nodes common with the upper hierarchical level are limited to the nodes located in the vicinity of the boundary of the area searched in the road network data on the lower hierarchical level. Therefore, the number of nodes for which the arrival costs are obtained can be reduced and the time required to search for the route is further reduced.

According to a seventh aspect, in the first aspect, the correspondence data includes;
first correspondence data showing whether a link included in the lower hierarchical level road network data is a link existing also on the upper hierarchical level road network data, and
second correspondence data showing that a node included in the lower hierarchical level road network data is a common node which exists also in the upper hierarchical level road network data,
wherein the second step selects the node located on the upper hierarchical level existing link on the basis of the first correspondence data, and the third step performs an external search in an extended search area by using the upper hierarchical level existing link until a common node specified by the second correspondence data appears for each node selected in the second step to obtain an arrival cost to each common node.

As stated above, according to the seventh aspect, after searching in a predetermined search area on the road network data on the lower hierarchical level, an external search is performed in an enlarged search area only with the nodes locoated on the upper hierarchical level existing links. Therefore it is possible to obtain arrival costs to nodes common with the upper hierarchical level without referring to the road network data on the upper hierarchical level.

According to an eighth aspect, in the seventh aspect,
the second step selects a node located on the upper hierarchical level existing link and located in the vicinity of the search area from among the nodes for which the minimum arrival costs have been obtained in the first step.

As stated above, according to the eighth aspect, nodes in the road network data on the lower hierarchical level used when performing the external search are limited to the nodes located in the vicinity of the boundary of the area searched in the road network data on the lower hierarchical level. Therefore the number of nodes for which the arrival costs to the common nodes are obtained can be reduced and the time required to search the route can be further reduced.

According to a ninth aspect, in the seventh aspect,
the plurality of hierarchical road network data are divided into a plurality of units,
each unit of the road network data recording an adjacent node for showing correspondence between connecting parts of adjacent units for a road divided at the connecting part between the adjacent units,
the correspondence data further including third correspondence data showing the position on the corresponding upper hierarchical level existing link for the adjacent node located on the upper hierarchical level existing link,
wherein the third step obtains the arrival cost lo the common node on the basis of the third correspondence data when the adjacent node appears in the external search.

As sated above, according to the ninth aspect, when each road network data is divided into a plurality of units, each unit of the road network data records adjacent nodes for showing correspondence between connecting parts of adjacent units for roads divided at the connecting parts of the units. For an adjacent node located on an upper hierarchical level existing link, third correspondence data indicating the position on the corresponding upper hierarchical level existing link is recorded and the arrival cost lo the common node is obtained on the basis of the third correspondence data when the adjacent node appears in the external search. Thus even if the common node for which the arrival cost is obtained exists in an adjacent unit which has not been read, it is possible to obtain the arrival cost to that common node.

According to a tenth aspect, in the ninth aspect,
the correspondence data further includes parent node data for specifying a node at an end of the corresponding upper hierarchical level existing link for the adjacent node located on the upper hierarchical level existing link.

According to an eleventh aspect, in the first aspect,
the correspondence data includes parent link data showing a link on the upper hierarchical level road network data corresponding to a link included in the lower hierarchical level road network data,
the second step selects the node located on the upper hierarchical level existing link on the basis of the parent link data, and
the third step performs an external search in an extended search area using the upper hierarchical level existing link for each node selected in the second step to a node immediately before the parent link data changes to obtain an arrival cost to each common node.

As stated above, according to the eleventh aspect, the parent link data is recorded as correspondence data and the nodes are selected and the arrival costs to the common nodes are estimated on the basis of the parent link data, thus reducing the amount of the correspondence data.

According to a twelfth aspect, an apparatus for selecting an optimum route on a map using map data including a hierarchical structure of a plurality of road network data at different degrees of minuteness includes:
map data storing portion storing the map data including the plurality of hierarchical road network data, the plurality of road network data being hierarchically structured in such a way that the degree of minuteness becomes lower from a lower hierarchical level to an upper hierarchical level;
correspondence data storing portion storing correspondence data showing correspondence between the road network data on the lower hierarchical level and the road network data on the upper hierarchical level;
a first cost obtaining portion for obtaining minimum arrival costs (the cost means a distance or a travel time) from a starting point of a search for individual nodes existing in a predetermined search area from the starting point of the search on the road network data on the lower hierarchical level;
a node selecting portion for selecting a node located on a link existing in the upper hierarchical level road network data (hereinafter referred to as an upper hierarchical level existing link) from among the nodes for which the minimum arrival costs have been obtained in the first cost obtaining portion on the basis of the correspondence data;
a second cost obtaining portion for obtaining an arrival cost to a node common with the upper hierarchical level which first appears when following the upper hierarchical level existing link on the basis of the correspondence data for each node selected by the node selecting portion; and
a third cost obtaining portion for obtaining a minimum arrival cost from the search starting point to each common node on the basis of the minimum arrival cost obtained by the first cost obtaining portion and the arrival cost obtained by the second cost obtaining portion;
wherein the optimum route is newly searched for on the road network data on the upper hierarchical level using the minimum arrival costs to the individual common nodes obtained by the third cost obtaining portion as initial conditions.

As stated above, according to the twelfth aspect, after searching in a predetermined area on the road network data on the lower hierarchical level, the nodes located on the upper hierarchical level existing links are selected and the minimum arrival costs lo the common nodes with the upper hierarchical level which first appear on the upper hierarchical level existing links are obtained. Therefore the search results can be shifted to the road network data on the upper hierarchical level without causing an abnormal route such as a U-turn route and a bypass route. Furthermore, according to the twelfth aspect, it is not necessary to include virtual common nodes with the road network data on the lower hierarchical level in the road network data on the upper hierarchical level and therefore the amount of recorded data decreases and the route searching can be done at higher speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a route searching apparatus according to a first embodiment of the present invention.

FIGS. 2(A) and 2(B) are a diagram showing the relation between a real map and road network data representative of the map.

FIGS. 3(A) and 3(C) are a diagram for describing the hierarchical structure of the route searching data stored in the route searching data storage device 4.

FIGS. 6(A) and 6(B) are a diagram showing various manners in which the route search result on the starting side and the route search result on the destination side are connected.

FIGS. 8(A)–8(C) are a diagram for describing the operation for calculating the minimum cost from the search starting point on the hierarchical level $\alpha 0$ to a peripheral node on the hierarchical level $\alpha 1$.

Figures 4A, 4B:
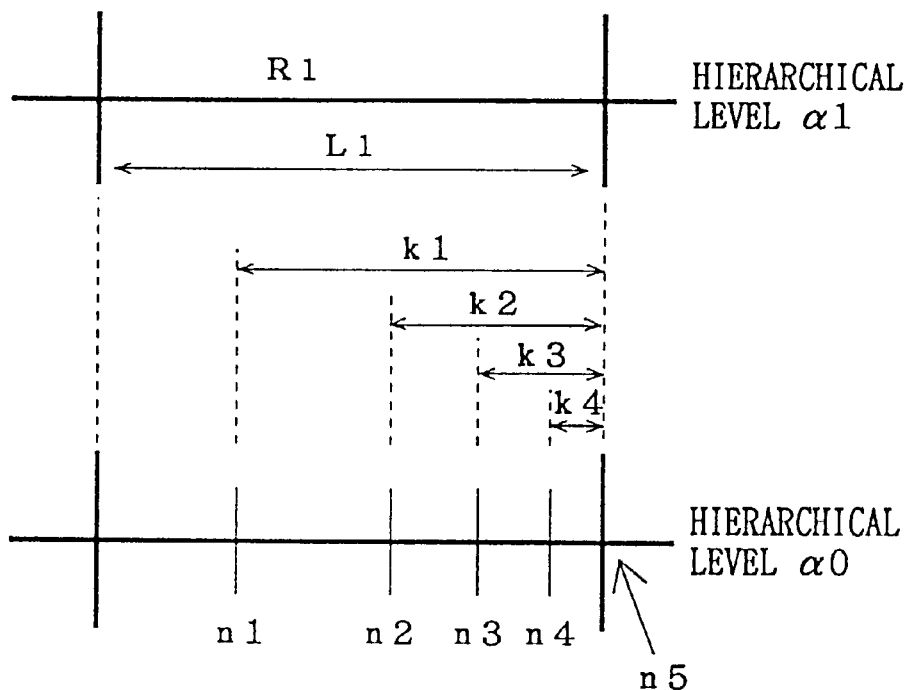
FIGS. 4(A) and 4(B) are a diagram showing an example of the relation between each node on the hierarchical level $\alpha 0$ and the corresponding link on the hierarchical level $\alpha 1$ and the correspondence data representative of the same.

DESCRIPTION OF THE PREFERRED EMBODIMENTS (1) First Preferred Embodiment

FIG. 1 is a block diagram showing the structure of a route searching apparatus according to a first embodiment of the present invention. In FIG. 1, the route searching apparatus of this embodiment includes a position detecting data storage device 1, a position detecting device 2, a point input device 3, a route searching data storage device 4, an optimum route searching device 5, a map display data storage device 6, an output data generating device 7, a route guiding device 8 and an output device 9.

The position detecting data storage device 1 includes a recording medium such as a CD-ROM for storing position detecting data used to detect the present position of a vehicle, in which a detailed road network including all roads capable of passage of vehicles is described, for example. The position detecting device 2 obtains an approximate position and the locus of the vehicle using speed and curved angle of the vehicle and the electronic radio wave from a satellite (GPS) and further obtains the correct present position of the vehicle by referring to the position detecting data stored in the position detecting data storage device 1. Now, when obtaining a route from the present position, a user obtains the road where the vehicle is presently existing with the position detecting data and enters the coordinates of the present position into the optimum route searching device 5. The point input device 3 operates in response to operation by the user to input the coordinates of a destination for which the route is obtained into the optimum route searching device 5 (it also inputs the starting point, if needed.)

The route searching data storage device 4 includes a recording medium such as a CD-ROM for storing route searching data used to select the optimum route. The route searching data is composed of road network data recording a plurality of road networks at different levels of minuteness in a hierarchical structure and correspondence data recording the relations between the different hierarchical levels. (The contents of the data will be fully described later.)

The optimum route searching device 5 obtains the optimum route from the starting point to the destination using the route searching data stored in the route searching data storage device 4. The starting point is set on the basis of the present position of the vehicle detected by the position detecting device 2 or the coordinates of the starting point entered from the point input device 3. At this time, the optimum route searching device 5 selects the nearest road as a starting link from the routs searching data. The destination is set on the basis of destination information entered from the point input device 3. At this time, the optimum route searching device 5 selects the nearest road as an object link from the route searching data.

The map display data storage device 6 includes a recording medium such as a CD-ROM, which stores map display data including configurations of roads and ground, configurations of bays, rivers, parks, etc. on the map. The output data generating device 7 refers to the map display data stored in the map display data storage device 6 to generate image data for displaying the present position of the vehicle obtained by the position detecting device 2 and a map near the position, or a map in the area that the user desires. If the displayed area includes the route obtained by the optimum route searching device 5, the output data generating device 7 generates and outputs image data with the route.

The route guiding device 8 outputs guidance information for guiding and leading the vehicle (e.g., speech information such as "Turn to the right at the intersection 100 m ahead" and/or display information) on the basis of the optimum route from the starting point to the destination outputted from the optimum route searching device 5 and the present position of the vehicle obtained by the position detecting device 2.

The output device 9 includes a display, a speaker and the like, which displays image data and outputs speech information provided from the output data generating device 7 and the route guiding device 8.

Next, contents of the various data used in this embodiment will be described in more detail.

First, the route searching data stored in the route searching data storage device 4 of FIG. 1 will be described. FIG. 2 shows a real map (refer to FIG. 2(A)) and road network data representative of the map (refer to FIG. 2(B)). As shown in FIG. 2(A), the real map includes information on configuration of the ground, configurations of fixed objects, configurations of roads, connections of the roads, etc. If such a road network on the map is intactly represented as graphic data, it amounts to a large quantity of data. Accordingly, to reduce the quantity of data, as shown in FIG. 2(B), the roads on the real map are expressed in vector form as each individual lines on the basis of their center lines and stored in the route searching data storage device 4. In such road network data, intersections are called nodes and roads between the intersections are called links.

The above-described road network data has hierarchical structure to reduce the time required to obtain the route. FIG. 3 is a diagram for describing the hierarchical structure of the road network data. As shown in FIG. 3, a road network on the lower hierarchical level $\alpha 0$ including all roads (refer to FIG. 3(A)) and a road network on the upper hierarchical level $\alpha 1$ including main roads such as free ways and national roads (refer to FIG. 3(B)) are produced and stored in the route searching data storage device 4 as the data having hierarchical structure shown in FIG. 3(C). In FIG. 3, the road network data has two hierarchical levels, but it may include a larger number of hierarchical levels. However, note that the road network data is described hereinafter as including the two hierarchical levels, the most detailed road network hierarchical level (the hierarchical level $\alpha 0$) and the rough road network hierarchical level (the hierarchical level $\alpha 1$) for simplification.

In the hierarchical road network data described above, one real intersection or one real road may be described in a plurality of hierarchical levels depending on its importance. In this case, in this embodiment, the route searching data storage device 4 records data showing correspondence of common parts (hereinafter referred to as correspondence data) in advance.

FIG. 4 shows the relation between nodes on the hierarchical level $\alpha 0$ and the corresponding link on the hierarchical level $\alpha 1$ and an example of correspondence data representative of it. As shown in FIG. 4(A), the correspondence data is recorded about such nodes that exist as nodes on the hierarchical level $\alpha 0$ but are represented on the hierarchical level $\alpha 1$ merely as halfway points on the corresponding link (parent link). In this case, the correspondence data for each node includes a number showing the parent link on the hierarchical level $\alpha 1$ and data indicative of the position on the parent link. In this embodiment, the share S is used as the data indicative of the position on the parent link. This share S is obtained as $$S = k/L$$

In the equation above, k indicates an arrival cost (distance or travel time) on the road from an end of the link R1 on the hierarchical level $\alpha 1$ to an object node on the hierarchical level $\alpha 0$. L represents the total cost ($0 \leq k \leq L$) of the link R1 on the hierarchical level $\alpha 1$.

For example, the correspondence data recorded for the node n3 existing on the hierarchical level $\alpha 0$ includes the number R1 of the parent link on the hierarchical level $\alpha 1$ and its share S3 (=k3/L1.) FIG. 4(B) shows an example of actually recorded correspondence data.

Figure 5:
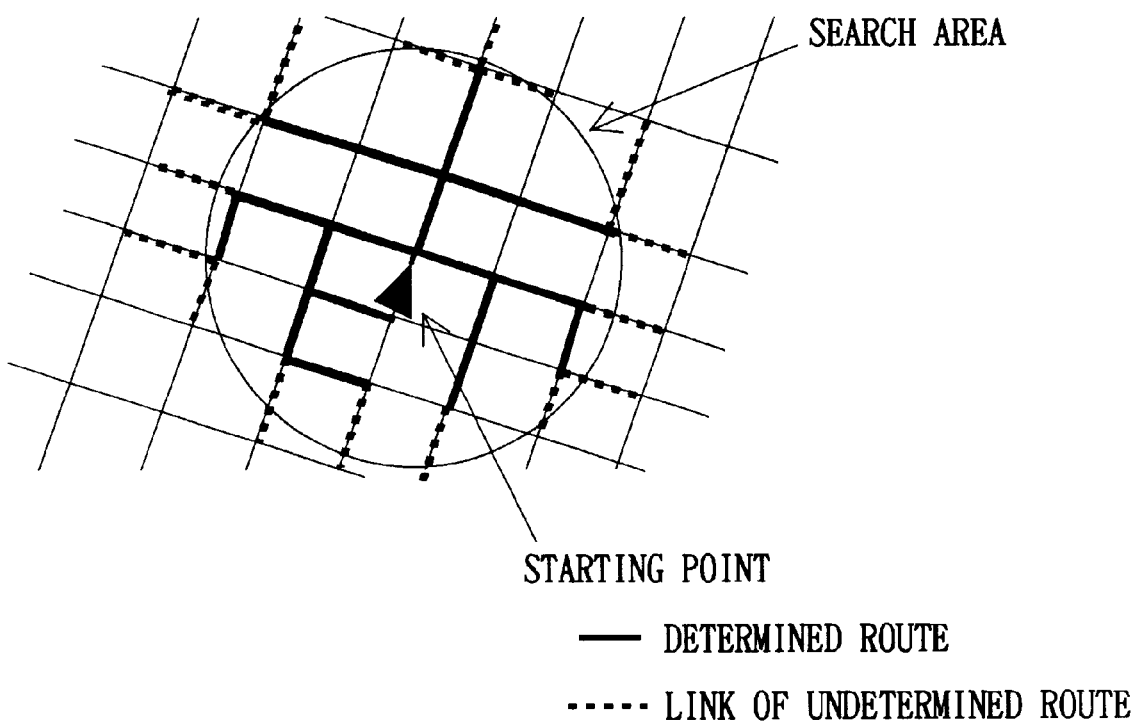
FIG. 5 is a diagram schematically showing the route search results in the vicinity of the starting point.
Figure 7:
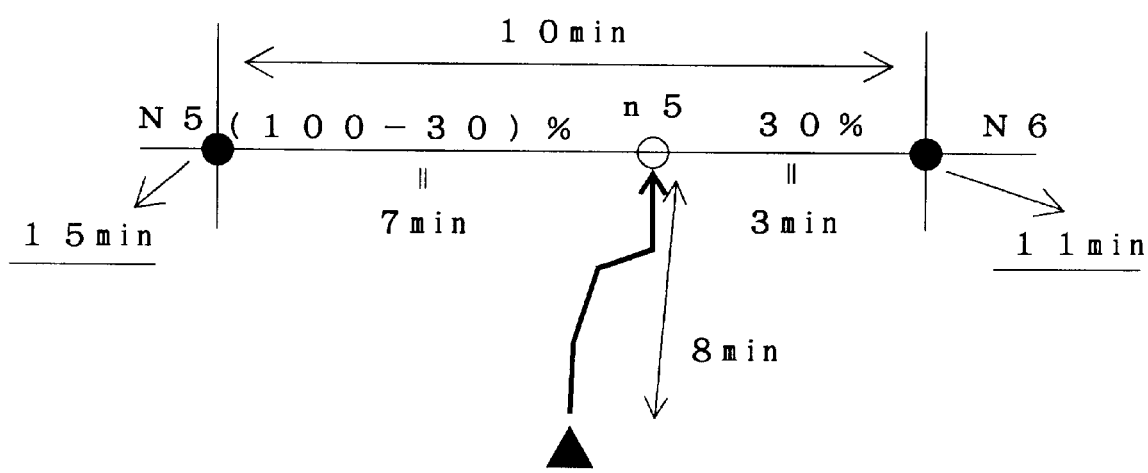
FIG. 7 is a diagram for describing the operation for calculating the cost from a search starting point or the hierarchical level $\alpha 0$ to a peripheral node on the hierarchical level $\alpha 1$ via a particular node.
Figure 9:
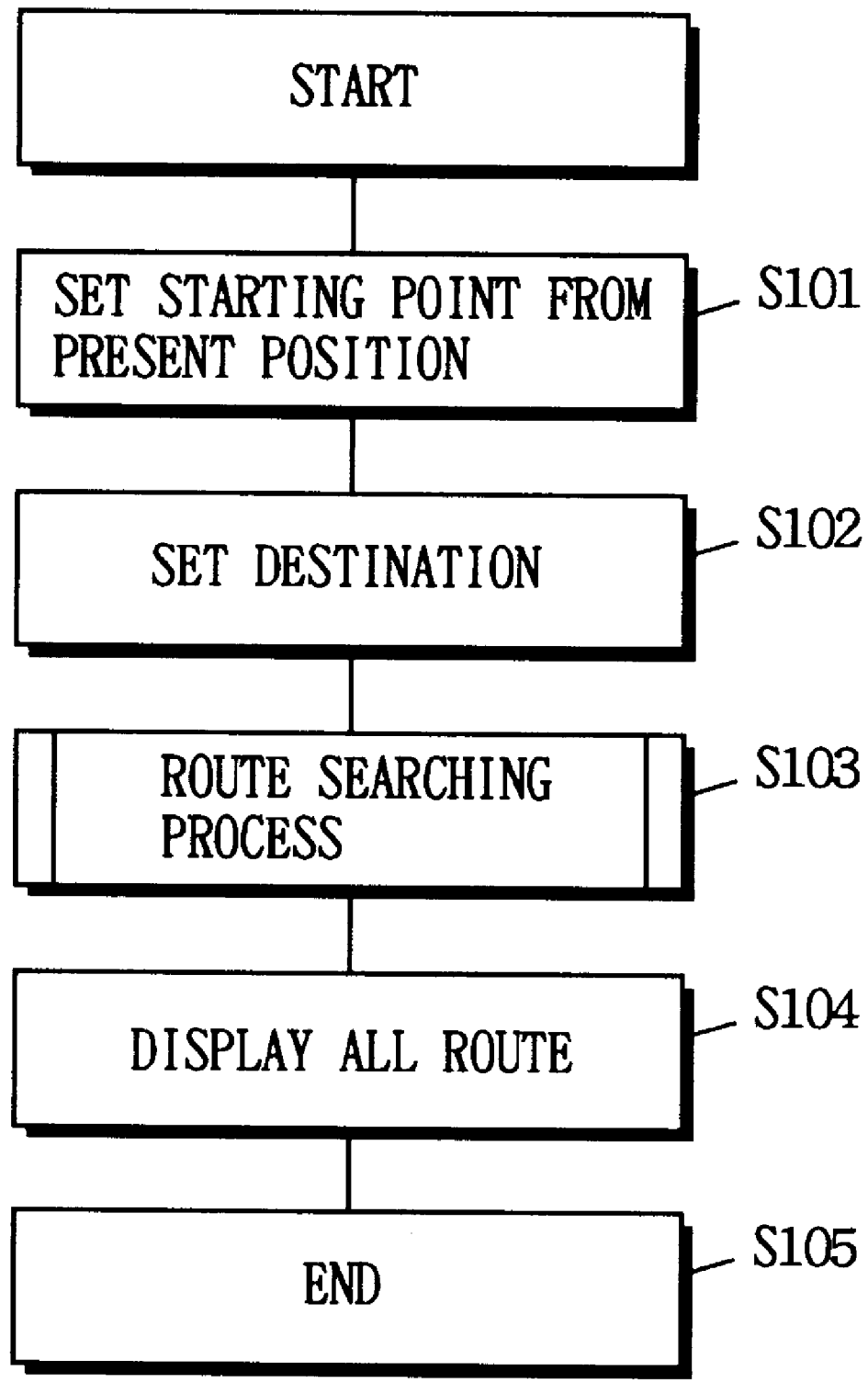
FIG. 9 is a flow chart showing the route searching operation of the first embodiment.
Figure 10:
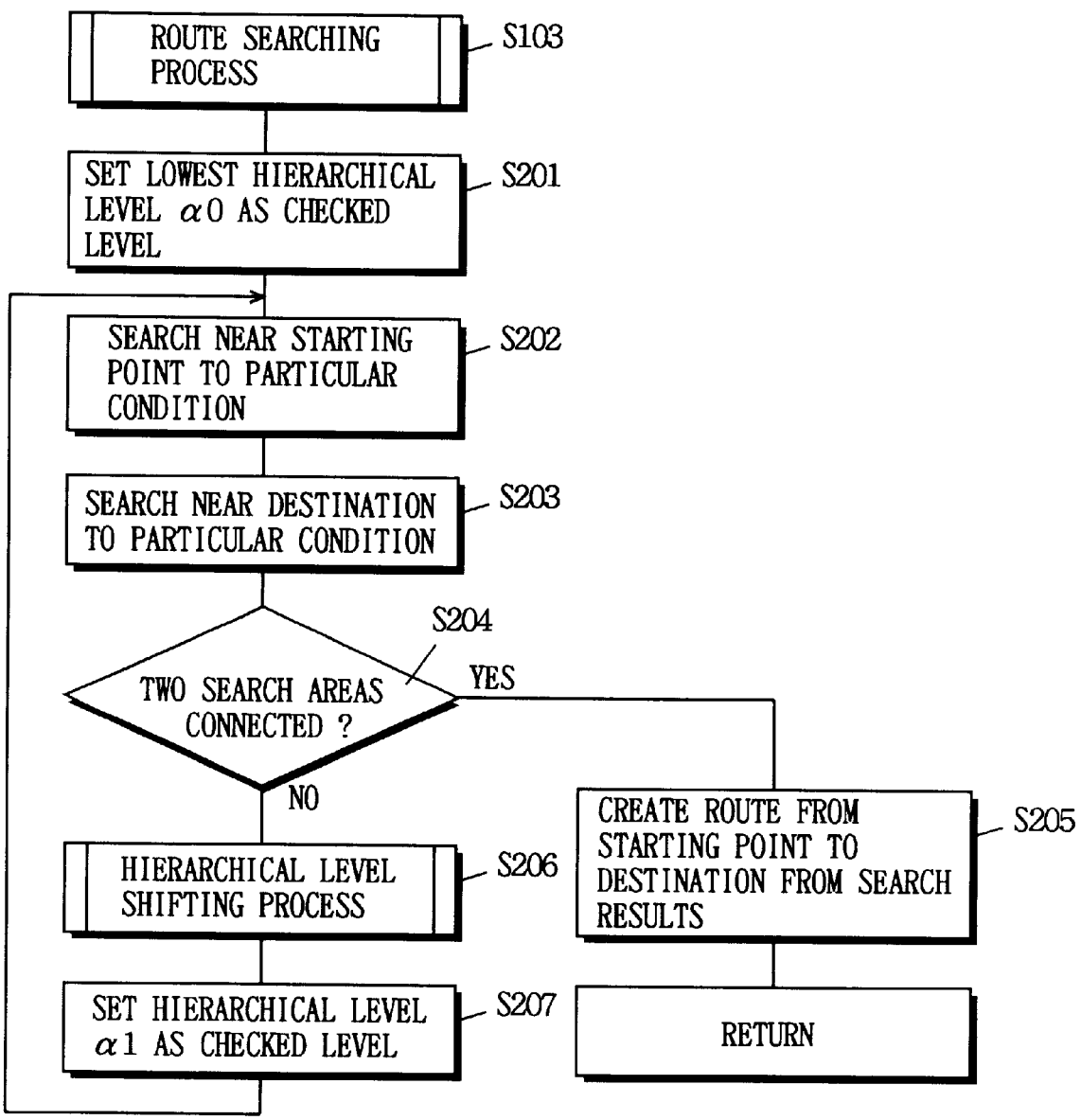
FIG. 10 is a flow chart showing detailed operation of the subroutine step S103 of FIG. 9.
Figure 11:
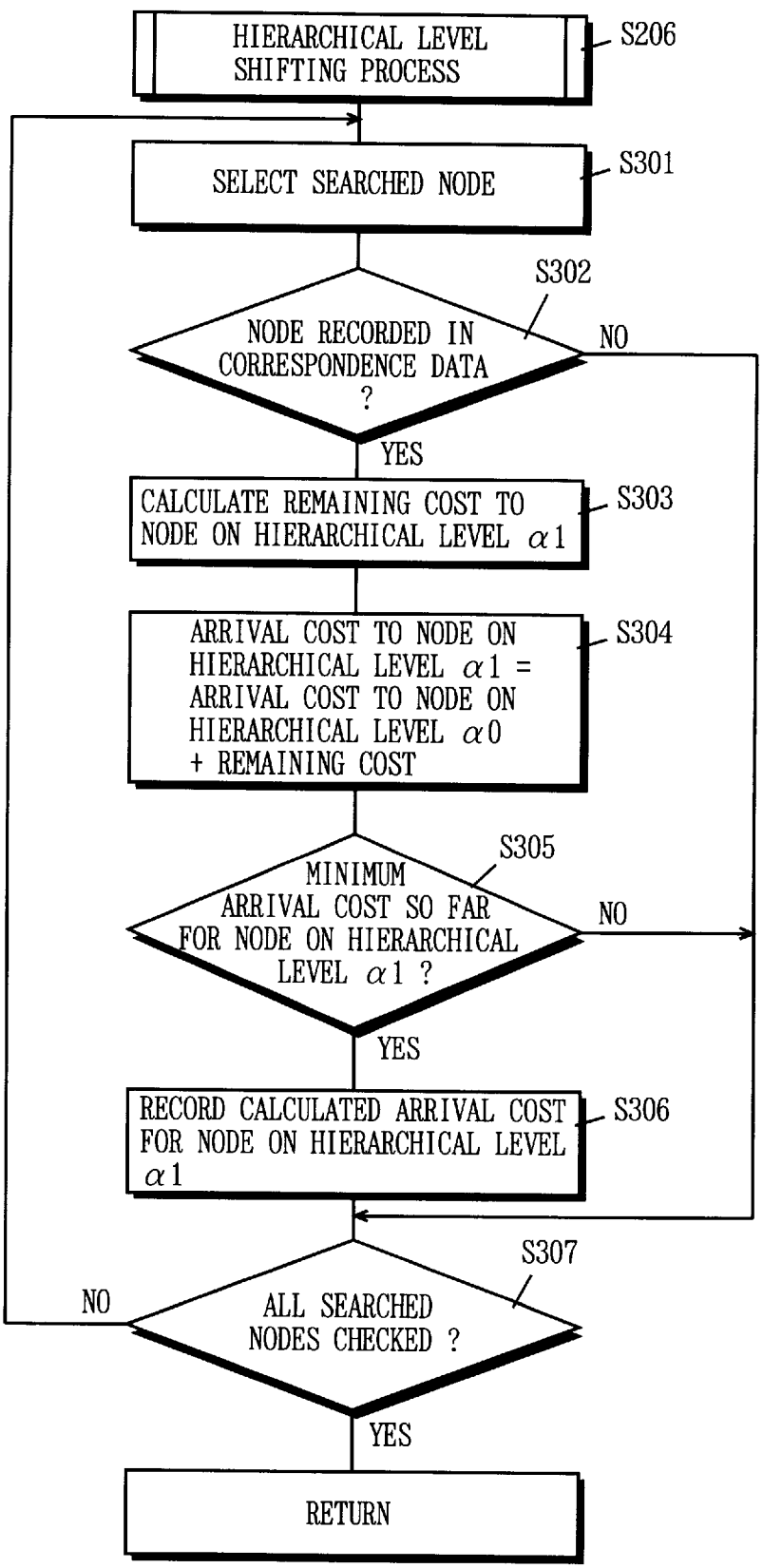
FIG. 11 is a flow chart showing detailed operation of the subroutine step S206 of FIG. 10.

FIG. 5 is a diagram schematically showing a result of a route search in the vicinity of the starting point on the hierarchical level $\alpha 0$. FIG. 6 is a diagram showing how the result of a route search on the starting point side and the result of a route search on the destination side connect. FIG. 7 is a diagram for describing operation for calculating the cost from the search starting point on the hierarchical level $\alpha 0$ to a peripheral node on the hierarchical level $\alpha 1$ via a particular node. FIG. 8 is a diagram for describing operation for calculating the minimum cost from the search starting point on the hierarchical level $\alpha 0$ to the peripheral node on the hierarchical level $\alpha 1$. FIG. 9 to FIG. 11 are flow charts showing the route searching operation in the first embodiment. Referring to FIG. 5 to FIG. 11, the route searching operation of this embodiment will be described in detail.

First, the optimum route searching device 5 sets the coordinates of the present position of the vehicle detected by the position detecting device 2 or the coordinates of the starting point set by the point input device 3 as a starting point of the route to be obtained. (Step S101 in FIG. 9) At this time, the optimum route searching device 5 reads the route searching data for the corresponding position on the hierarchical level $\alpha 0$ from the route searching data storage device 4 to find a road closest to the coordinates of the set starting point as a starting point road, for example.

Next, the optimum route searching device 5 sets the coordinates of the destination set by the point input device 3 as a destination of the route to be obtained. (Step S102) At this time, the optimum route searching device 5 reads route searching data for the corresponding position on the hierarchical level $\alpha 0$ from the route searching data storage device 4 on the basis of the set coordinates to determine a destination road.

Next, the optimum route searching device 5 conducts route searching process. (Step S103) The subroutine step S103 is shown in detail in FIG. 10. Referring to FIG. 10, first, the optimum route searching device 5 sets the hierarchical level $\alpha 0$ as a searched hierarchical level. (Step S201) Next, the optimum route searching device 5 obtains the optimum route from the starting point road to a peripheral point in the vicinity of the starting point using the route searching data for the hierarchical level $\alpha 0$. (Step S202) This method is performed by using the conventionally known Dijkstra method. In the Dijkstra method, when obtaining the optimum route to the peripheral node, starting from the starting point link, the nodes are searched in the order from the one with the smallest arrival evaluation value to the peripheral node (e.g., travel time) to check nodes which can be reached via the nodes (reference point method.) This range of search (search area) is gradually enlarged from the starting point. When the search area is enlarged to a predetermined search limit condition (for example, when the length of the route obtained from the search starting point reaches a certain distance (e.g., 2 km), or when an estimated required time in travelling the route obtained from the search starting point reaches a certain time (e.g., 10 minutes), the search from the starting point is terminated. FIG. 5 schematically shows an example of results of a route search conducted in the vicinity of the starting point in Step S202.

Next, the optimum route searching device 5 performs a search to the search limit condition in the vicinity of the destination using the route searching data for the hierarchical level $\alpha 0$, similarly to Step S202. (Step S203) Next, the optimum route searching device 5 determines whether the search area on the starting side and the search area on the destination side have been connected as shown in FIG. 6(A). (Step S204) If the search area on the starting side and the search area on the destination side have been connected, the optimum route searching device 5 produces the route from the starting point to the destination on the basis of the search results in Step S202 and Step S203. (Step S205) Then it returns to the operation of FIG. 9.

On the other hand, if the distance between the starting point and the destination is long and the search area on the starting side and that on the destination side do not connect, the optimum route searching device 5 continues the route search using the hierarchical level $\alpha 1$ as shown in FIG. 6(B) to connect the route on the hierarchical level $\alpha 1$. Before performing the route search on the hierarchical level $\alpha 1$, the optimum route searching device 5 conducts hierarchical level shifting process from the hierarchical level $\alpha 0$ to the hierarchical level $\alpha 1$. (Step S206) Details of this subroutine step S206 are shown in FIG. 11. Now referring to FIG. 11, the operation of the hierarchical level shifting process will be described.

The optimum route searching device 5 first selects any one of the nodes already searched on the hierarchical level $\alpha 0$. (Step S301) Now, the arrival cost from the starting point of search (the starting point or the destination) to the selected node is taken as T0. Next, the optimum route searching device 5 determines whether the node selected in Step S301 has the correspondence data of FIG. 4(B). (Step S302) If the selected node has the correspondence data, the optimum route searching device 5 calculates the remaining cost T1 from that selected node to the node to which the parent link on the hierarchical level $\alpha 1$ connects. (Step S303) This remaining cost T1 is obtained as a product of the cost C of the parent link on the hierarchical level $\alpha 1$ and the share S recorded in the correspondence data as $$T1 = C \times S$$

Next, the optimum route searching device 5 obtains the arrival cost Tc from the starting point of search to the node on the parent link on the hierarchical level $\alpha 1$ via the node on the hierarchical level $\alpha 0$ (Step S304) as $$Tc = T0 + T1$$

As an example, consider the road network having the connection shown in FIG. 7. In FIG. 7, the arrival cost T0 from the starting point of search (the starting point or the destination) to the node n5 on the hierarchical level $\alpha 0$ is 8 minutes. The total cost C of the entire parent link on the hierarchical level $\alpha 1$ is 10 minutes. The share S of the node n5 with respect to the parent link is 30%. In this case, the remaining cost T1 from the node n5 to the node N6 on the parent link is given as $$T1 = C \times S = 10 \text{ (min)} \times 30 \text{ } (\%) = 3 \text{ (min)}$$

Accordingly, the arrival cost Tc from the starting point of search to the node N6 of the parent link on the hierarchical level $\alpha 1$ via the node n5 on the hierarchical level $\alpha 0$ is given as $$Tc = T0 + T1 = 8 \text{ (min)} + 3 \text{ (min)} = 11 \text{ (min)}$$

Next, the optimum route searching device 5 determines whether the arrival cost Tc obtained in Step S304 is the smallest in the arrival costs obtained so far about the node of the parent link on the hierarchical level $\alpha 1$. (Step S305) When the arrival cost Tc is the smallest, the optimum route searching device 5 records and stores the arrival cost Tc obtained in Step S304 as the minimum cost for the node of the parent link. (Step S306) On the other hand, if the arrival cost Tc obtained in Step S306 is not the smallest, the optimum route searching device 5 does not perform the operation in Step S306.

After Step S305, or when it is determined that the arrival cost Tc is not the smallest in Step S305, the optimum route searching device 5 determines whether all nodes searched on the hierarchical level $\alpha 0$ have been checked. (Step S307) If there exist unchecked nodes, the optimum route searching device 5 returns to the operation in Step S301 to select the next node and repeats the operation above. If a node selected in Step S301 has no correspondence data, the optimum route searching device 5 moves directly to the operation in Step S307 without performing the operations in Steps S303 to S306.

Figures 8A, 8B:
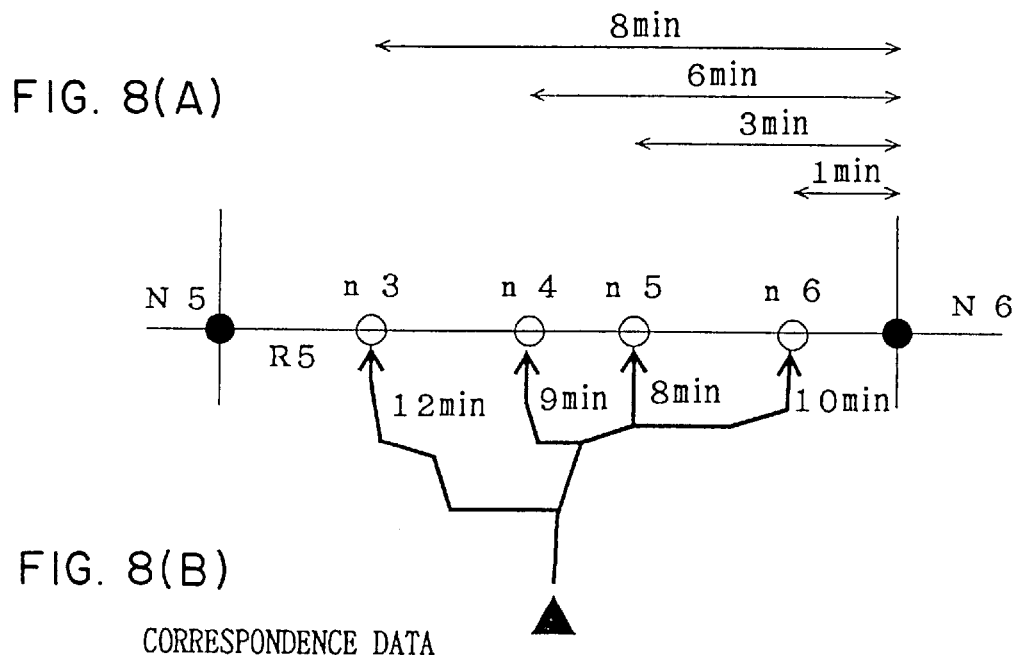

Now, as an example, consider the road network having the connection shown in FIG. 8(A). In FIG. 8(A), the arrival costs from the search starting point to the nodes n3, n4, n5 and n6 on the hierarchical level $\alpha 0$ are 12 minutes, 9 minutes, 8 minutes and 10 minutes, respectively. As shown in the correspondence data in FIG. 8(B), the shares S of the nodes n3, n4, n5 and n6 starting from the node N6 of the parent link R5 are 80%, 60%, 30%, and 10%, respectively. As shown in the road network data of FIG. 8(C), the total cost of the entire parent lank R5 (the cost between the node N5 and the node N6) is 10 minutes.

Under the condition above, suppose that the node n3 is selected first. The arrival cost from the search starting point to the node N6 of the parent link via the node n3 is 12+8=20 (min). At this point, if the arrival cost 20 minutes is the smallest in the costs already obtained for the node N6, the optimum route searching device 5 records and stores the arrival cost 20 minutes as the minimum cost for the node N6. Next, suppose that the node n4 has been selected. The arrival cost from the search starting point to the node N6 of the parent link via the node n4 is 9+6=15 (min). The arrival cost 15 minutes is smaller than the arrival cost 20 minutes obtained for the node n3, so that the optimum route searching device 5 newly records and stores the arrival cost 15 minutes as the minimum cost for the node N6. Next, suppose that the node n5 has been selected. The arrival cost from the search starting point to the node N6 of the parent link via the node n5 is 8+3=11 (min). The arrival cost 11 minutes at this time is smaller than the arrival cost 15 minutes obtained for the node n4 and therefore the optimum route searching device 5 newly records and stores this arrival cost 11 minutes as the minimum cost for the node N6. Subsequently, this way, the minimum value of the arrival cost from the search starting point to the node N6 is rewritten every time a smaller arrival cost is obtained. Accordingly, the minimum arrival cost from the search starting point to the node N6 is finally recorded and stored and the optimum route between the two is determined on the basis of the cost.

The detection of the minimum arrival cost explained referring to FIG. 8 is performed for all of peripheral nodes on the hierarchical level α1 (the nodes connected to links in the search area on the hierarchical level α0 and located in the vicinity of the outside of the search area.) As a result, the minimum arrival cost to each peripheral node from the search starting point and the corresponding optimum route are obtained.

In Step S307, when it is determined that all nodes searched on the hierarchical level α0 have been checked, the optimum route searching device 5 returns to the operation of FIG. 10. Referring to FIG. 10 again, the optimum route searching device 5 sets the hierarchical level α1 as a checked hierarchical level (Step S207) and continues searching on the hierarchical level α1. That is to say, the optimum route searching device 5 performs the search in a particular condition area with the plurality of peripheral nodes with which the minimum arrival costs have been obtained in the hierarchical level shifting process in Step S206 as new starting points of the search on the hierarchical level α1. (Steps S202 and S203) The particular condition for the search on the hierarchical level α1 is selected to be so large that the search result on the starting side and the search result on the destination side necessarily connect (for example, selected to cover at least half of entire Japan.) Next, the optimum route searching device 5 determines whether the search area on the starting side and the search area on the destination side have connected. (Step S204) If the starting-side search area and the destination-side search area have connected, the optimum route searching device 5 creates the route from the starting point to the destination on the basis of the search results in Steps S202 and S203. (Step S205) At this time the optimum route searching device 5 adopts the search results already obtained on the hierarchical level α0 for the route in the vicinities of the starting point and the destination. Then the optimum route searching device 5 returns to the operation of FIG. 9.

Referring to FIG. 9 again, the optimum route searching device 5 provides the search results lo the output data generating device 7 and the route guiding device 8. In response, the output data generating device 7 and the route guiding device 8 generate data for route guide and outputs the data to the output device 9. As a result, the output device 9 displays the obtained optimum route. (Step S104)

As explained above, in the first embodiment, for the nodes which are described on the hierarchical level α0 and correspond to halfway positions on the links on the hierarchical level α1, data indicating the relation with the corresponding links on the hierarchical level α1 (correspondence data) is previously recorded and the search results on the hierarchical level α0 are shifted to the hierarchical level α1 using the correspondence data. That is to say, a certain area from the search starting point is searched on the hierarchical level α0 and then the remaining costs from the individual nodes already searched for on the hierarchical level α0 to the individual peripheral nodes on the hierarchical level α1 (the nodes in the vicinity of the outside of the search area on the hierarchical level α0) are calculated by using the correspondence data. Then the minimum arrival costs from the starting point of search to the peripheral nodes on the hierarchical level α1 are obtained on the basis of the search results on the hierarchical level α0 and the remaining costs, and the minimum arrival costs are used as initial conditions for the search on the hierarchical Level α1. Then the hierarchical levels α0 and α1 can be connected while avoiding an abnormal route such as a U-turn path and a bypass route without increasing the number of nodes on the hierarchical level α1. As a result, the amount of stored data and the amount of calculation can be reduced and a low-priced and high-speed route searching apparatus can be realized.

In the first embodiment, the shares are recorded as data showing positions on parent links in the correspondence data (refer to FIG. 4(B)) and the remaining costs to the parent links are calculated on the basis of the shares, but the remaining costs to the parent links themselves may be recorded as the data showing the positions on the parent links.

Figure 12:
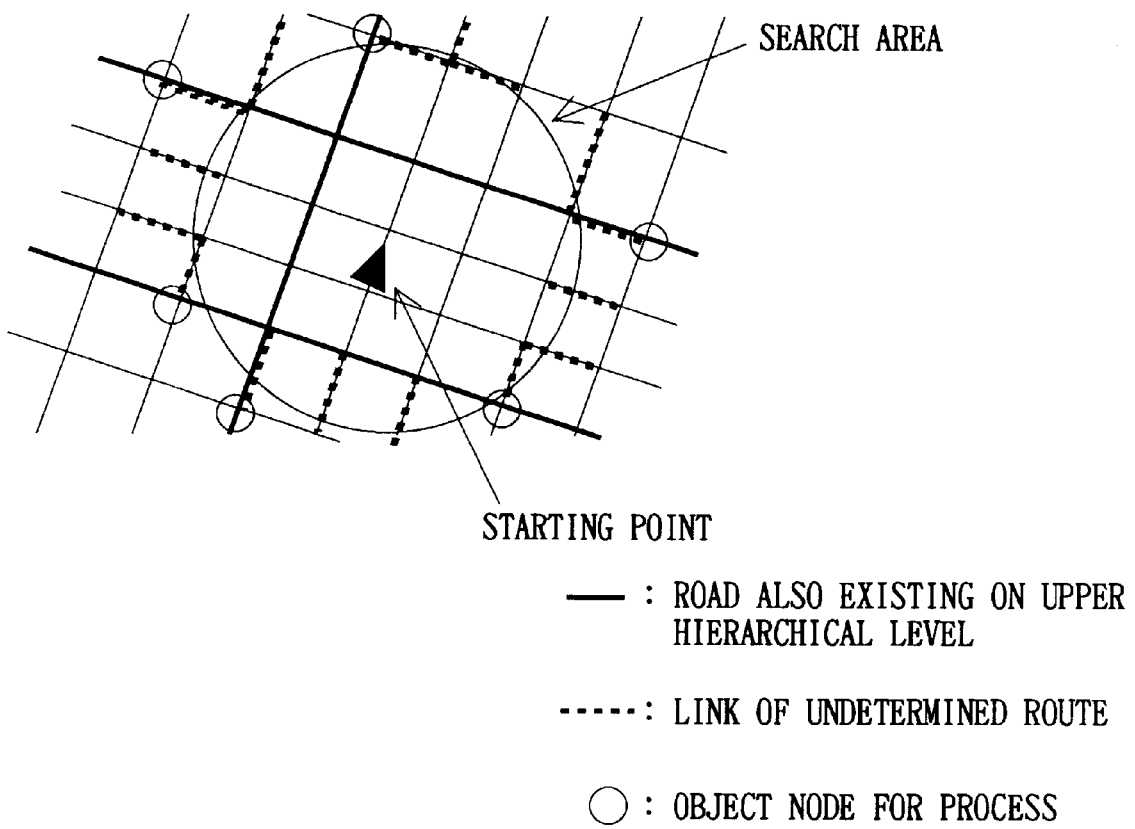
FIG. 12 is a diagram showing a reduced number of nodes subjected to the hierarchical level shifting process under a particular condition.

Also, in the first embodiment, since the hierarchical level shifting process is performed about all nodes in the area searched on the hierarchical level α0, the amount of processing of calculation for costs increases even when using the correspondence data. Accordingly, as shown in FIG. 12, the above-described hierarchical level shifting process may be performed only with the searched nodes connected to the links lying over the boundary between the searched area and the unsearched area (on condition that the links exist also on the hierarchical level α1.) This reduces the number of nodes with which costs must be calculated in the hierarchical level shifting process to reduce the amount of processing. Another embodiment using such a method is now be described.

(2) Second Embodiment

Figure 13:
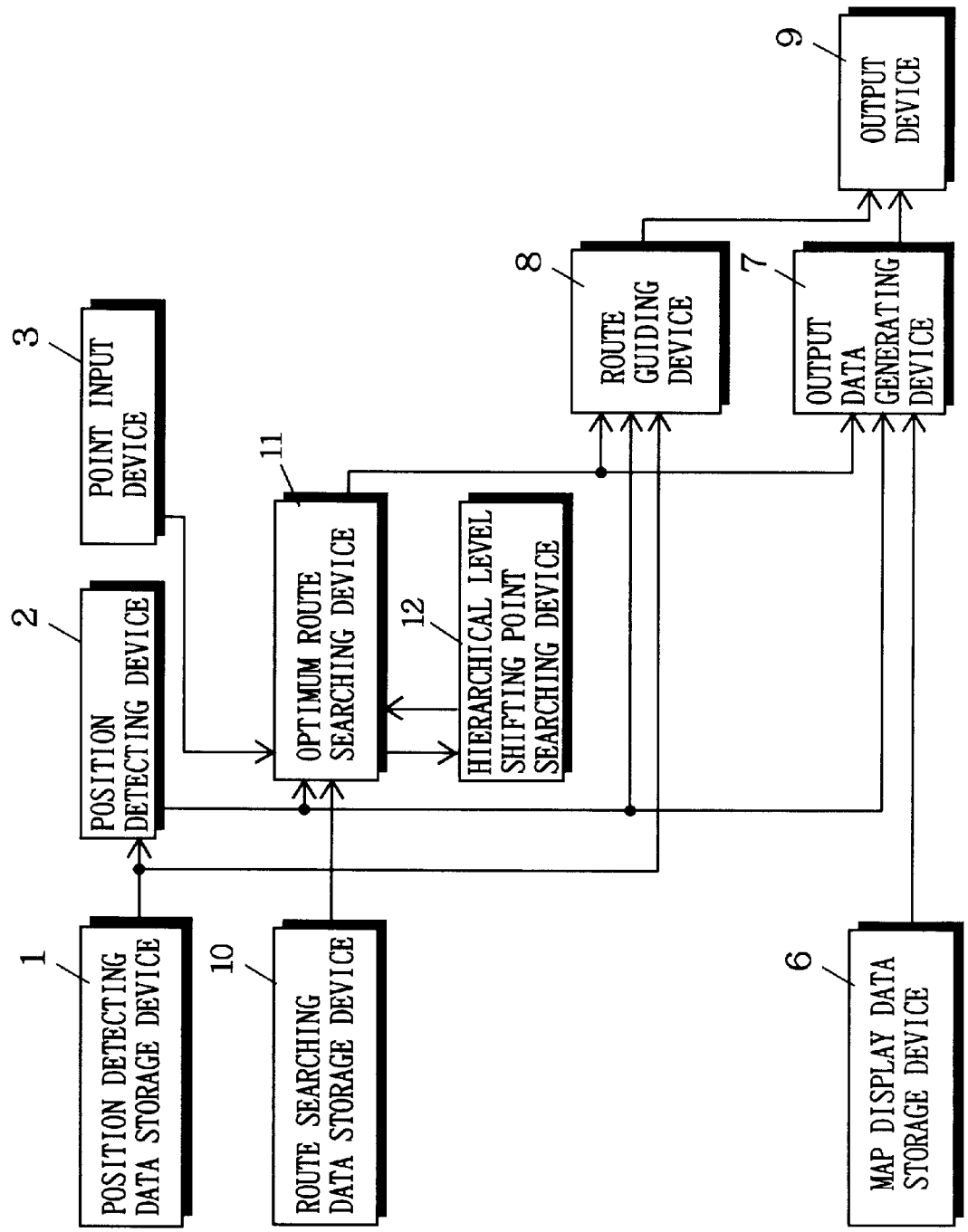
FIG. 13 is a block diagram showing the structure of a route searching apparatus according to a second embodiment of the present invention.

FIG. 13 is a block diagram showing the structure of a route searching apparatus according to a second embodiment of the present invention. In FIG. 13, the route searching apparatus of this embodiment includes a position detecting data storage device 1, a position detecting device 2, a point input device 3, a map display data storage device 6, an output data generating device 7, a route guiding device 8, an output device 9, a route searching data storage device 10, an optimum route searching device 11, and a hierarchical level shifting point searching device 12. This apparatus is different from that of the first embodiment in the route searching data storage device 10, the optimum route searching device 11 and the hierarchical level shifting point searching device 12. Now the second embodiment will be described mainly focusing on the different portions.

The route searching data storage device 10 includes a recording medium such as a CD-ROM, which stores route searching data used to select the optimum route. This route searching data includes road network data having a plurality of road networks at different levels of minuteness recorded in a hierarchical structure and correspondence data recording the relations between the different hierarchical levels. Unlike the road network data in the first embodiment, each hierarchical level of the road network data in this embodiment is recorded in the form divided into sections. The correspondence data in this embodiment includes different contents from that in the first embodiment. (Details of the data contents will be described later.)

The optimum route searching device 11 obtains the optimum route from a starting point to a destination using the route searching data stored in the route searching data storage device 10. The starting point is set on the basis of the present position of the vehicle detected by the position detecting device 2 or the coordinates of the starting point inputted from the point input device 3. At this time, the optimum route searching device 5 selects the nearest road from the route searching data as a starting road. The destination is set on the basis of destination information inputted from the point input device 3. At this time, the optimum route searching device 5 selects the nearest road from the route searching data as a destination road.

Now, it is different from the first embodiment in that initialization is made when shifting the search between road networks on different hierarchical levels by using the hierarchical level shifting point searching device 12 explained below. On the basis of the results inputted from the hierarchical level shifting point searching device 12, it starts searching on a different hierarchical level, similarly to the first embodiment. (The detailed operation will be described later.)

On the basis of the route searching data used by the optimum route searching device 11 and the results of the search on a certain hierarchical level, the hierarchical level shifting point searching device 12 makes initialization for starting a search on the upper hierarchical level. The hierarchical level shifting point searching device 12 then outputs the results to the optimum route searching device 11. (The detailed operation will be described later.)

Next, the route searching data recorded in the route searching data storage device 10 used in the second embodiment will be described in detail.

Figure 14:
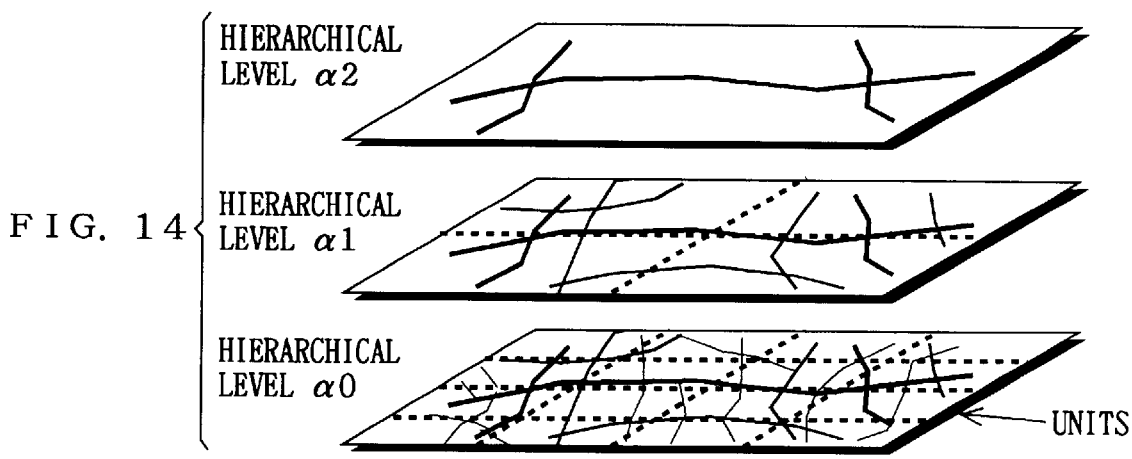
FIG. 14 is a diagram showing part of the road network data recorded in the route searching data storage device 10.

FIG. 14 shows part of the road network data recorded in the route searching data storage device 10. In FIG. 14, the road network data in this embodiment is in a hierarchical form with each individual road networks at different levels of minuteness, like the first embodiment. Furthermore, in this embodiment, the road network data is divided into certain data sizes or certain sections in each hierarchical level, as shown by dotted lines in FIG. 14. (The divided data is called a unit.) The data is divided in order to avoid waste of internal memory caused by reading the road network in an area unrelated to the search when searching with the optimum route searching device 11. In this case, the road network data is usually divided in such a way that the number of units is larger and the recorded area is smaller in a lower hierarchical level recording a more detailed road network.

Figure 15:
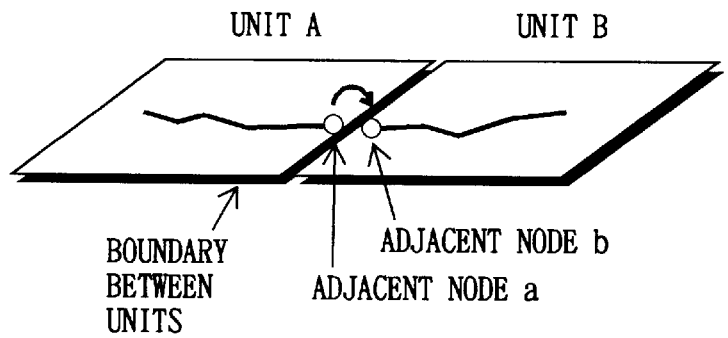
FIG. 15 is a diagram for describing the adjacent nodes used at a boundary between units.

Now, when the road network data is divided into a plurality of units, the roads are divided at boundaries between the units. Accordingly, as shown in FIG. 15, for a road which lies over units, the road network data of the individual units record the point on the road at the intersection of the boundary and the road as an adjacent node. Such an adjacent node is recorded in the units on both sides of the divided road. For the adjacent node a on the road shown in FIG. 15, the unit A records the data showing that the adjacent node a connects with the adjacent node b in the adjacent unit B on the same road. This data makes it possible to know the connection with a road in an adjacent unit even when the road network data is divided into units.

Figure 16:
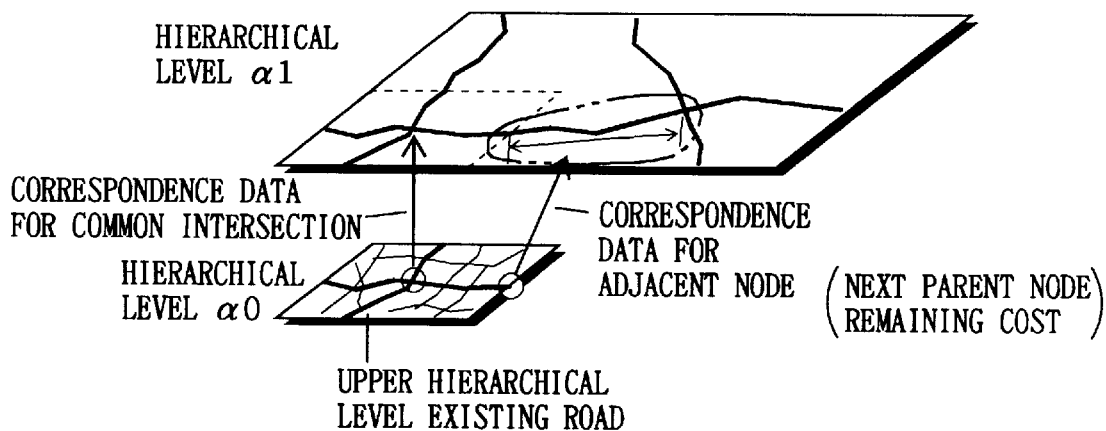
FIG. 16 is a diagram for describing the correspondence data used in the second embodiment.

Next, the route searching data includes correspondence data representing connections between different hierarchical levels, as well as the road network data with the structure above. Referring to FIG. 16, contents of the correspondence data will be described. For simplicity, it will be described only about the correspondence data between two hierarchical levels, the hierarchical level with the most detailed road network (the hierarchical level $\alpha 0$) and the hierarchical level with the rough read network (hierarchical level $\alpha 1$.)

In FIG. 16, part of the roads recorded in a certain unit on the hierarchical level $\alpha 0$ are recorded on the hierarchical level $\alpha 1$, too (the thick lines in the figure.) Hence, determination data is recorded so that whether the roads on the hierarchical level $\alpha 0$ exist also on the hierarchical level $\alpha 1$ can be determined only with the road network data for the hierarchical level $\alpha 0$. The determination data is realized in the form of flag information (upper existence flag), for example. That is to say, 0 is set as the upper existence flag when the road exists only on the hierarchical level $\alpha 0$ and 1 is recorded when the road exists on the hierarchical level $\alpha 1$ too. When an intersection in the unit on the hierarchical level $\alpha 0$ exists also on the hierarchical level $\alpha 1$, the number of the common intersection (a parent node number) on the hierarchical level $\alpha 1$ is recorded for this intersection. Furthermore, for an adjacent node existing on a road also existing on the upper hierarchical level and located at the boundary between units, the remaining cost from the end of the unit to the next common intersection and the parent node number of the common intersection are recorded.

Figure 17:
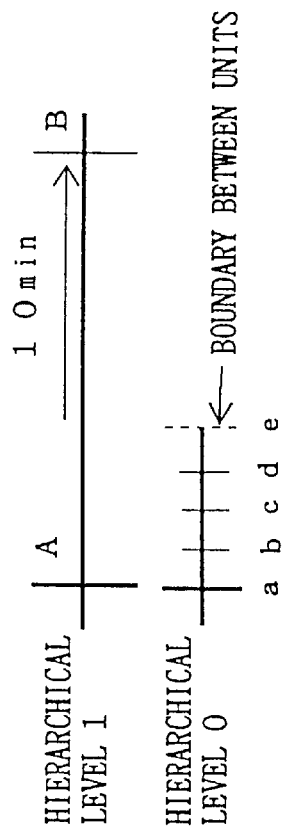
FIGS. 17(A) and 17(B) are a diagram showing an example of a hierarchical road and the route searching data representing it in the second embodiment.

FIG. 17 shows an example of hierarchical roads and the data recorded to represent them in the route searching data having the contents above. FIG. 17(A) shows a link between the node a and the node e recorded in a certain unit on the hierarchical level $\alpha 0$ and the link between the node A and the node B recorded on the hierarchical level $\alpha 1$. The node a shows the same intersection as the node A on the hierarchical level $\alpha 1$. The node e is an adjacent node which exists on the link between the nodes A–B on the hierarchical level $\alpha 1$. It is assumed that the remaining cost from the adjacent node e to the node B is 10 minutes.

FIG. 17(B) shows recorded data corresponding to the situation shown in FIG. 17(A). Link numbers, node numbers on both sides of the links, and travel times of the links are recorded as the road network data. The upper existence flags, part of the correspondence data, are recorded together with such road network data. The remaining correspondence data are recorded in a common node table and an adjacent node table. The common node table records common node data indicative of intersections common to the hierarchical levels $\alpha 0$ and $\alpha 1$ (e.g., the parent node A for the intersection a.) For adjacent nodes (e.g., the adjacent node e) on the roads existing also on the upper hierarchical level $\alpha 1$ (referred to as an upper hierarchical level existing road), the adjacent node table records remaining costs to the next common intersections on the upper hierarchical level existing roads in adjacent units and the parent nodes of the common intersections (e.g., the node B).

Next, the route searching operation of the second embodiment having the structure above will be described.

First, like the first embodiment, the optimum route searching device 11 reads the route searching data for the hierarchical level $\alpha 0$ to determine a starting road and a destination road. Then starting from the starting road and the destination a road, the optimum route searching device 11 suitably reads the units required to search for routes therearound on the hierarchical level $\alpha 0$ from the route searching data storage device 10 and performs a route search. Furthermore, if the distance is long and the search areas do not connect, the optimum route searching device 11 switches the checked hierarchical level from the hierarchical level $\alpha 0$ to the hierarchical level $\alpha 1$ and searches for routes. (Refer to FIG. 6)

Figure 18:
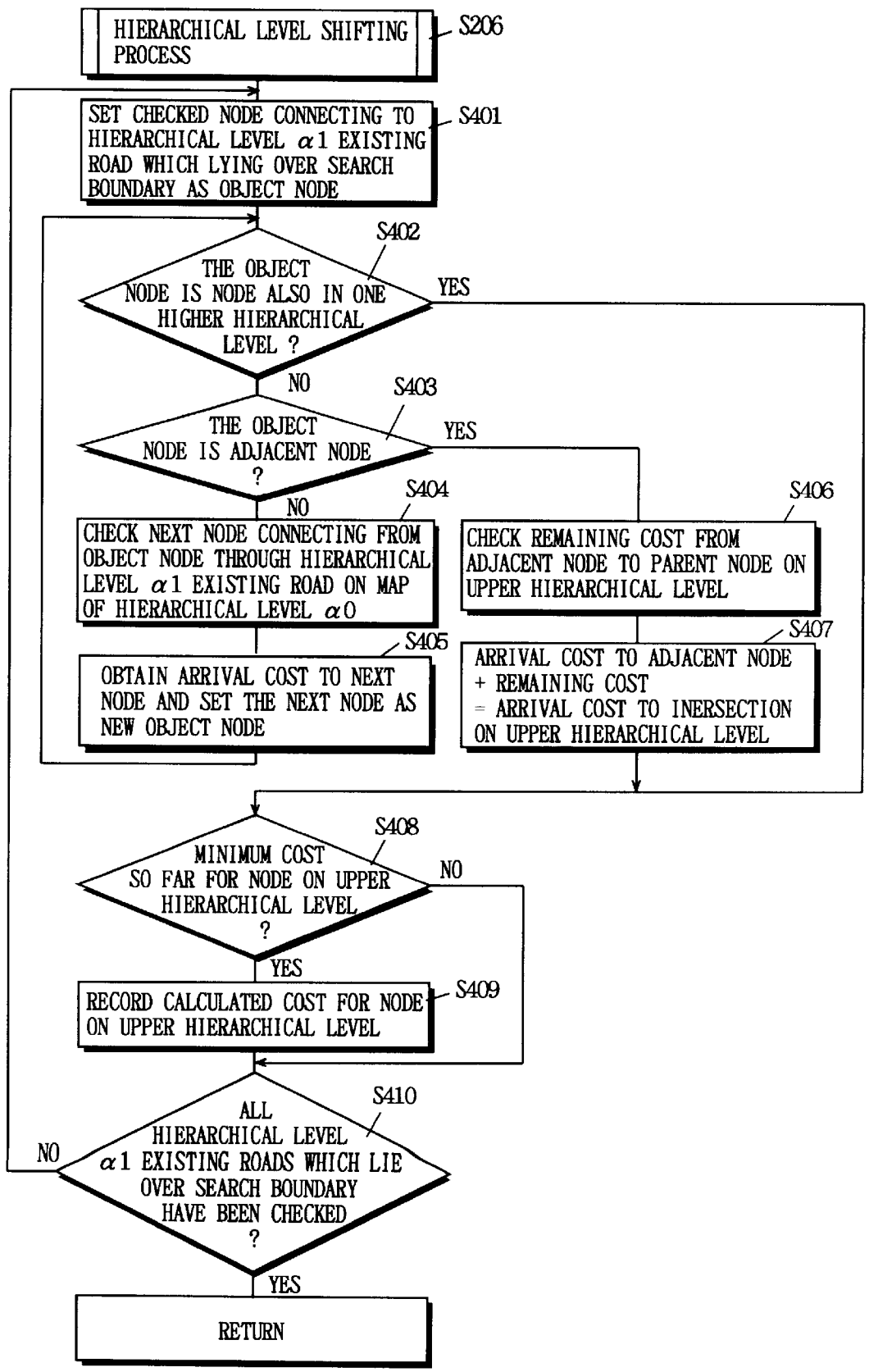
FIG. 18 is a flow chart showing the hierarchical level shifting process of the second embodiment.

Now, the second embodiment makes initialization before searching the hierarchical level $\alpha 1$ (the hierarchical level shifting process) in a different method from the first embodiment. This initialization operation will now be described referring lo the flow chart of FIG. 18.

As has been stated above, the optimum route searching device 11 conducts a search in the range of the search limit condition on the hierarchical level $\alpha 0$, starting from the starting and the destination road. Then if the searched areas do not connect, it activates the hierarchical level shifting point searching device 12 for initialization required to search the hierarchical level $\alpha 1$.

The hierarchical level shifting point searching device 12 refers to the route searching data including at least one unit that the optimum route searching device 11 has used to search the hierarchical level α0 and the results of searching the road network to extract nodes which exist also on the roads recorded on the hierarchical level α1 and are located near the boundary of the search area. It can be determined whether a road is recorded also on the hierarchical level α1 by referring to the upper existence flag shown in FIG. 17(B). As a result, in the road network shown in FIG. 9, for example, the nodes A–G surrounded by the circle are extracted. Next, the hierarchical level shifting point searching device 12 sets one of the extracted nodes as an object node. (Step S401) At this time, since the following operation differs depending on which node is set as an object node, the following operation will be described below for each individual cases.

Figure 20A:
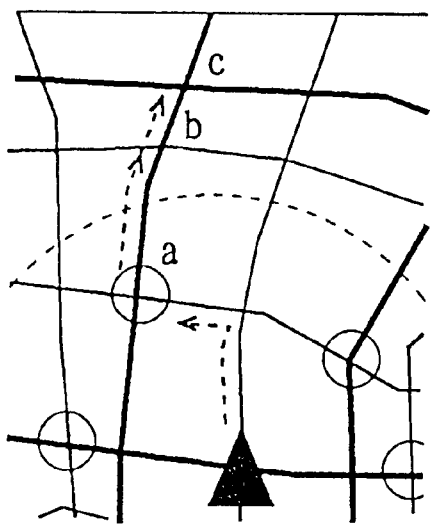
FIGS. 20(A)–20(C) are a schematic diagram for describing the hierarchical level shifting process of the second embodiment.

(1) Operation when the node a shown in FIG. 20(A) is set as an object node in Step S401.

In this case, the hierarchical level shifting point searching device 12 refers to the common node table shown in FIG. 17(B) to determine that the object node a is a node which does not exist on the upper hierarchical level α1 (i.e., a node without a parent node recorded.) (Step S402) Next, the hierarchical level shifting point searching device 12 refers to the adjacent node table shown in FIG. 17(B) to determine that the object node a is not an adjacent node. (Step S403) Next, the hierarchical level shifting point searching device 12 follows the road existing also on the hierarchical level α1 from the object node a on the road network data on the hierarchical level α0 to check the node appearing net. (Step S404) Then the node b shown in FIG. 20(A) is detected. Next, the hierarchical level shifting point searching device 12 obtains the arrival cost from the object node a to the next node b and sets the next node b as a new object node. (Step S405) At this time, the hierarchical level shifting point searching device 12 cumulatively adds the arrival cost from the node a to the node b to the arrival cost from the search starting point to the node a obtained by the search on the hierarchical level α0 to calculate the cost between the search starting point and the node b.

Next, the hierarchical level shifting point searching device 12 returns to the operation in Step S402 to determine that the newly set object node b is a node which does not exist on the upper hierarchical level α1. Next, the hierarchical level shifting point searching device 12 determines that the object node b is not an adjacent node. (Step S403) Next, the hierarchical level shifting point searching device 12 follows the road existing also on the hierarchical level α1 from the object node b on the road network data of the hierarchical level α0 to check the node appearing next. (Step S404) Thus the node c shown in FIG. 20(A) is detected.

Next, the hierarchical level shifting point searching device 12 obtains the arrival cost from the object node b to the next node c and sets the next node c as a new object node. (Step S405) At this time, the hierarchical level shifting point searching device 12 cumulatively adds the arrival cost from the node b to the node c to the arrival cost from the search starting point obtained about the node b to calculate the cost between the search starting point and the node c.

Next, the hierarchical level sifting point searching device 12 returns to the operation in Step S402 and determines that the newly set object node c is a node which exists also on the upper hierarchical level α1. Next, the hierarchical level shifting point searching device 12 determines that the arrival ost from the search starting point to the node c obtained as stated above is the minimum arrival cost calculated so far about the node c. (Step S408) This is due to the fact that the only one arrival cost has been calculated about the node c. Next, the hierarchical level shifting point searching device 12 records that arrival cost as the minimum arrival cost for the node c. (Step S409)

Figure 20B:
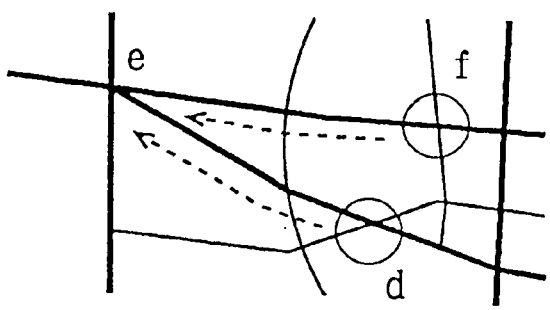

(2) Operation when the node d shown in FIG. 20(B) is set as an object node in Step S401 and then the node f is set as an object node.

In this case, the hierarchical level shifting point searching device 12 first calculates the arrival cost from the search starting point to the node e via the node d (a first arrival cost) and records it. Next, the hierarchical level shifting point searching device 12 calculates the arrival cost from the search starting point to the node e via the node f (a second arrival cost.) At this time, the second arrival cost is smaller than the first arrival cost, and hence the hierarchical level shifting point searching device 12 records the second arrival cost as the minimum arrival cost from the search starting point to the node e in pace of the first arrival cost.

Figure 20C:
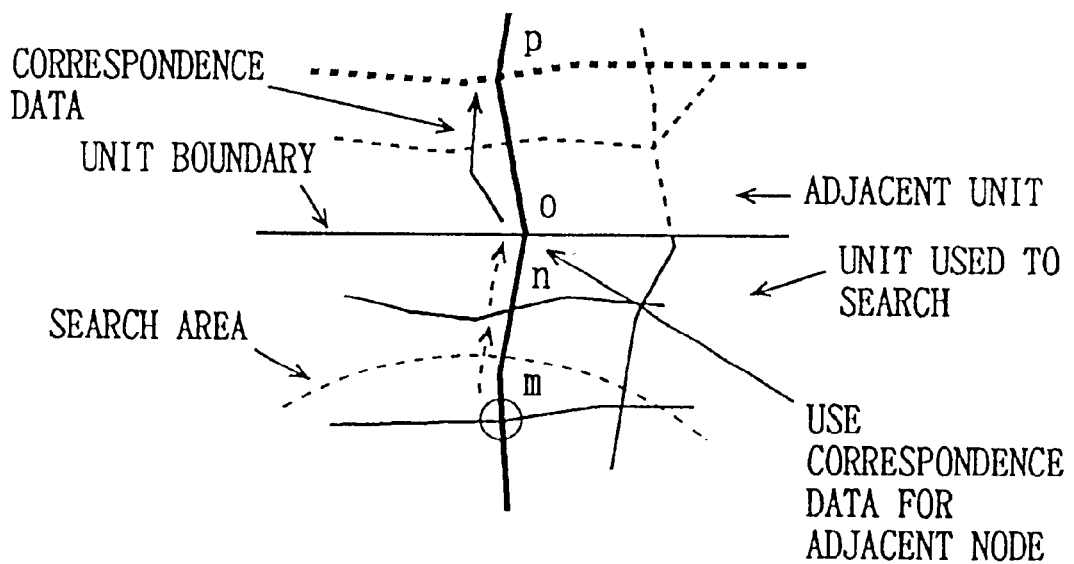
Figure 21:
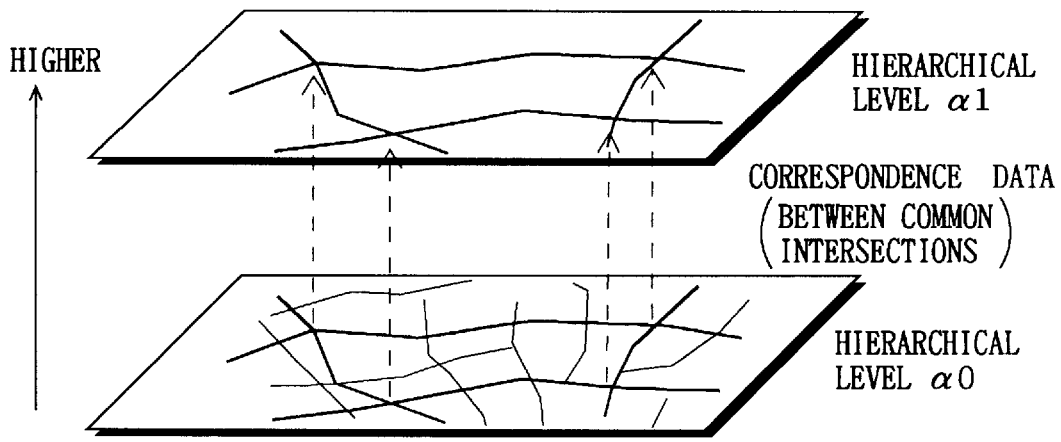
FIG. 21 is a diagram showing an example of a hierarchical road network used in the second and third conventional arts.
Figure 22:
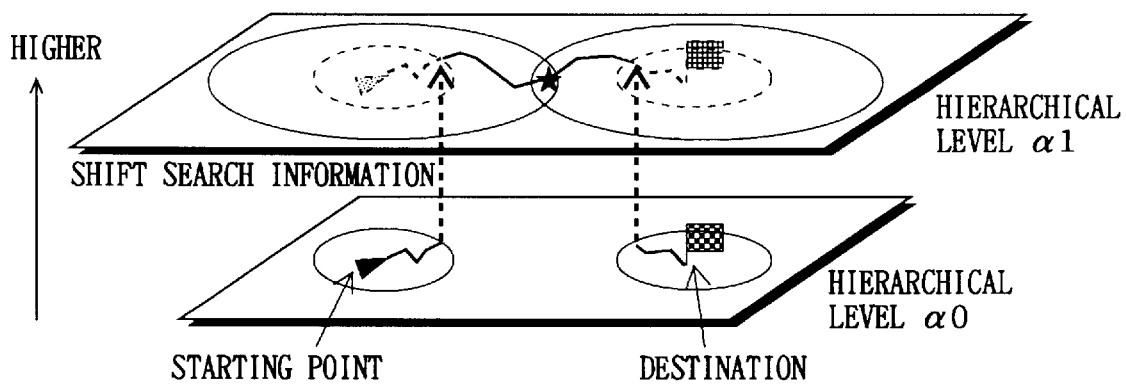
FIG. 22 is a diagram for describing the hierarchical route searching method adopted in the second and third conventional arts.
Figure 23A:
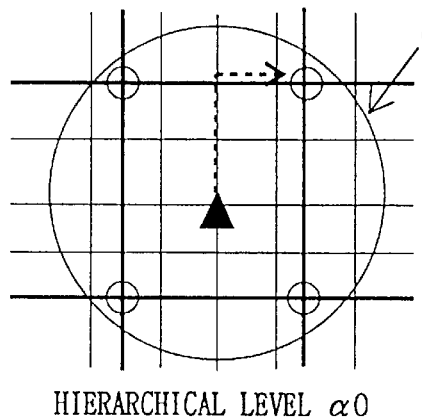
FIG. 23 is a schematic diagram for describing the hierarchical level shifting process performed in the second and third conventional arts.
Figure 23B:
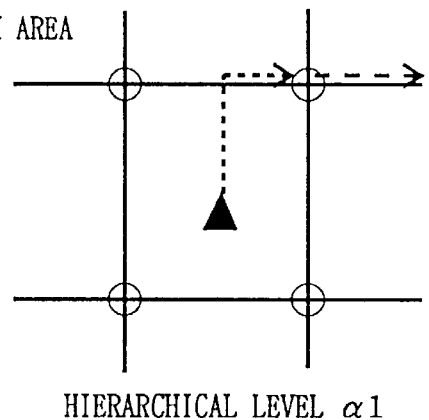
Figure 24A:
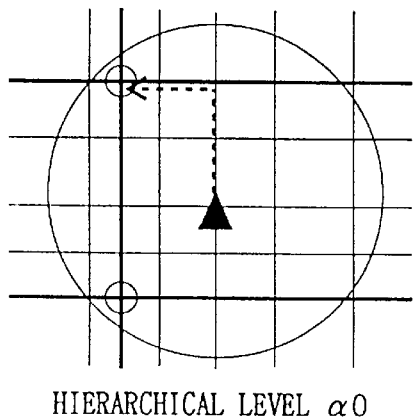
FIG. 24 is a diagram showing an example of an abnormal route occurring when the route search is performed in the second and third conventional arts.
Figure 24B:
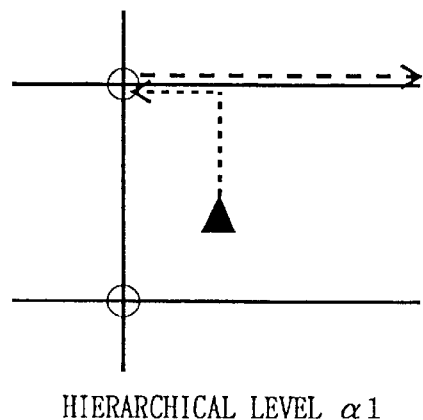
Figure 25A:
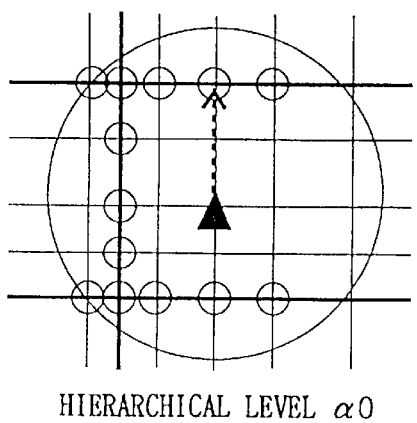
FIG. 25 is a schematic diagram for describing the method for preventing an abnormal route adopted in the fourth conventional art.
Figure 25B:
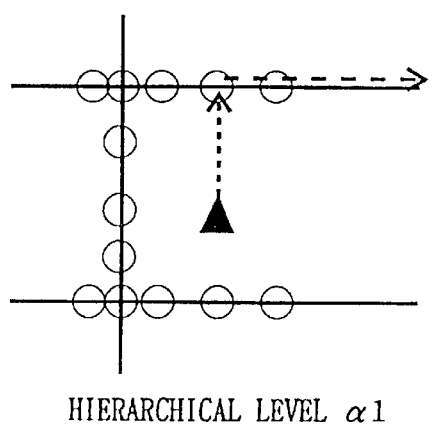

(3) Operation when the node m shown in FIG. 20(C) is set as an object node in Step S401.

As can be seen from the operation (1), the object node shifts as m→n→o in this case. Now, the node o is an adjacent node. Hence, the hierarchical level shifting point searching device 12 refers to the adjacent node table shown in FIG. 17(B) to determine that the object node is an adjacent node. (Step S403) Next, the hierarchical level shifting point searching device 12 refers to the adjacent node table shown in FIG. 17(B) to check the remaining cost to the parent node p corresponding to the adjacent node o (the node that appears next on the hierarchical level α1 when following the road existing also on the hierarchical level α1 from the adjacent node o.) (Step S405) Next, the hierarchical level shifting point searching device 12 adds the remaining cost to the parent node p obtained in Step S406 to the arrival cost from the search starting point to the adjacent node o (accumulated in Step S405) to obtain the arrival cost from the search starting point to the parent node p. (Step S407) If the arrival cost thus obtained is the minimum arrival cost for the parent node p (Step S408), the hierarchical level shifting point searching device 12 records the cost (Step S409).

Figure 19:
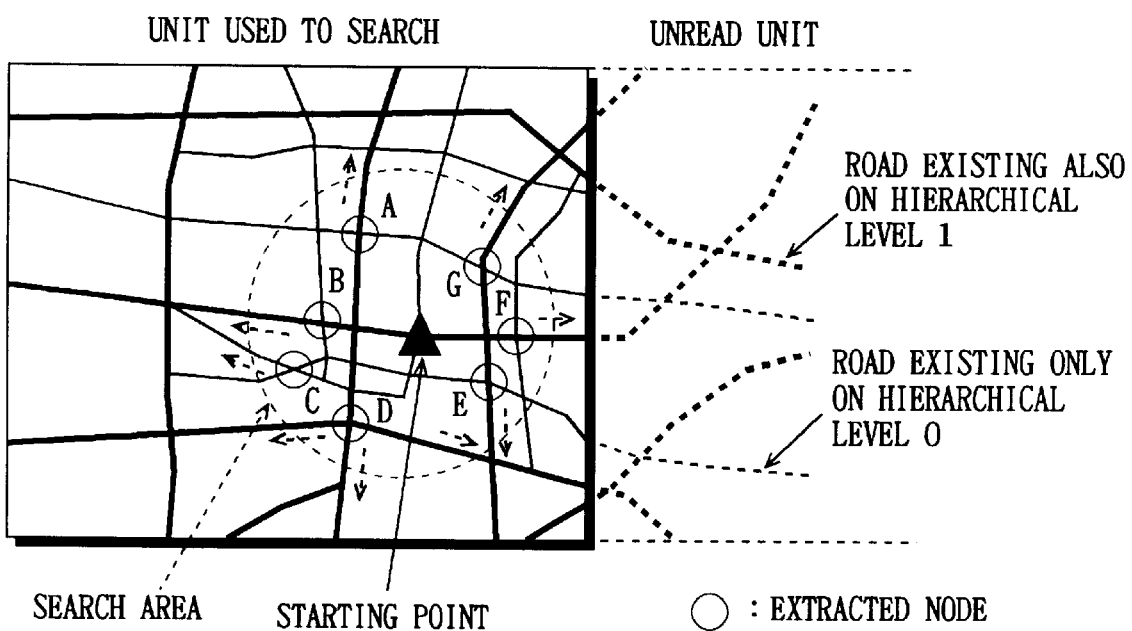
FIG. 19 is a diagram showing an example of nodes subjected to the hierarchical level shifting process on the road network in the second embodiment.

(4) Operation when the node D of FIG. 19 is set as an object node in Step S401.

In this case, the hierarchical level shifting point searching device 12 determines that the set object node D is a node which also exists on the upper hierarchical level α1. (Step S402) Next, the hierarchical level shifting point searching device 12 determines that the arrival cost from the search starting point to the object node D (obtained in the search on the hierarchical level α0) is the minimum arrival cost calculated so far for the node D (Step S408), for the only one arrival cost has been calculated for the node D. Next, the hierarchical level shifting point searching device 12 records that arrival cost as the minimum arrival cost for the node D. (Step S409)

When it is determined that the operation above has been applied to all nodes extracted under the particular condition from the searched node (the nodes A–G in FIG. 19) (Step S410), the hierarchical level shifting process is ended. The following operation is the same as that in the first embodiment.

This way, in the second embodiment, only the nodes that exist on the roads recorded also on the hierarchical level α1 and are located in the vicinity of the boundary of the search area are selected as objects of the hierarchical level shifting process. Accordingly, the number of calculations for cost is decreased as compared with the first embodiment, enabling higher speed hierarchical level shifting process. Furthermore, in the second embodiment, the parent node numbers are recorded only for the nodes in common with the hierarchical level α1 and the adjacent nodes and the remaining costs to the parent nodes are recorded only for the adjacent nodes, so that the amount of correspondence data is considerably reduced as compared with the first embodiment.

In the second embodiment, the upper existence flags are recorded as correspondence data in the route searching data together with the road network data and the parent node numbers are recorded in the common node table. However, instead, link numbers (parent link numbers) on the upper hierarchical level may be recorded for the links existing also on the upper hierarchical level. Then it is possible to know whether a link on the lower hierarchical level exists also on the upper hierarchical level. Furthermore, when following a link on the lower hierarchical level, a node at a boundary where the parent link number changes can be recognized as a common node.

In the second embodiment, the parent node numbers and the remaining costs to the next common nodes are recorded in the adjacent node table, but the link numbers on the upper hierarchical level and the shares may be recorded similarly to the first embodiment.

Although at has been stated that the Dijkstra method is used in the optimum route searching device 5 or 11 in the first and second embodiments, another route searching method may be used. The routes have been obtained in terms of the minimum arrival costs (distance or travel time), but the routes with the shortest costs may be obtained by using costs which take into account the degree of difficulty of driving depending on types and configurations of roads and the level of skill of drivers (e.g., setting a small cost for a wide national road, setting a large cost for a mountain road, etc.). Furthermore, although the correspondence data and the search operation have been described focusing on the nodes in this embodiment, the search may be performed while paying attention to the links instead of the nodes (for example, by using middle points on the links as objects of data recording, like the nodes.)

Although the first and second embodiments have been described with two hierarchical levels of route searching data to sampling the description, a large number of hierarchical levels may be used, in which case the route search can be performed more circumstantially.

While the invention has been described in detail, the foregoing description is in all aspects illustrative and not restrictive. It is understood that numerous other modifications and variations can be devised without departing from the scope of the invention.

What is claimed is:

1. A method for selecting an optimum route on a map by using map data including a hierarchical structure of a plurality of road network data at different degrees of minuteness, said plurality of road network data are hierarchically structured so that the degree of minuteness becomes lower from a lower hierarchical level to an upper hierarchical level, and correspondence data showing correspondence with the road network data on the upper hierarchical level is previously recorded for the road network data on the lower hierarchical level, said route searching method comprising:

a first step of obtaining minimum arrival costs from a starting point of a search about individual nodes existing in a predetermined search area, the predetermined search area extending from the starting point of the search on the road network data on the lower hierarchical level, the cost including distance and/or travel time;

a second step of selecting nodes located on an upper hierarchical level existing link, which is a link existing on the road network data on the lower hierarchical level that also exists on the upper hierarchical level, on the basis of said correspondence data from among the nodes for which the minimum arrival costs have been obtained in said first step, a third step of obtaining an arrival cost to a node in common with the upper hierarchical level which first appears when following said upper hierarchical level existing link on the basis of said correspondence data for each node selected in said second step, and a fourth step of obtaining a minimum arrival cost from the search starting point to each common node on the basis of the minimum arrival cost to the selected node obtained in said first step and the arrival cost to the common node obtained in said third step, wherein the optimum route is searched for on the road network data on the upper hierarchical level using the minimum arrival costs to individual said common nodes obtained in said fourth step as initial conditions.

2. The route searching method according to claim 1, wherein said correspondence data includes:

first correspondence data indicating that a node included in the road network data on the lower hierarchical level is a node located on said upper hierarchical level existing link, and second correspondence data indicating a position on the corresponding upper hierarchical level existing link for the node located on said upper hierarchical level existing link, wherein said second step selects the node located on said upper hierarchical level existing link on the basis of said first correspondence data, and said third step obtains the arrival cost to said common node on the basis of said second correspondence data.

3. The route searching method according to claim 2, wherein said first correspondence data includes parent link data for specifying a corresponding upper hierarchical level existing link.

4. The routs searching method according to claim 2, wherein said second correspondence data includes a ratio of occupation of the arrival cost from the node located on said upper hierarchical level existing link to a node at an end of the corresponding upper hierarchical level existing link in a cost of the entirety of the corresponding upper hierarchical level existing link.

5. The route searching method according to claim 2, wherein sad second correspondence data includes an arrival cost from the node located on said upper hierarchical level existing link to the node at the end of the corresponding upper hierarchical level existing link.

6. The route searching method according to claim 2, wherein said second step selects a node located on said upper hierarchical level existing link and located in the vicinity of said predetermined search area from among the nodes for which the minimum arrival costs have been obtained in said first step.

7. The route searching method according to claim 1, wherein said correspondence data includes:

first correspondence data indicating whether a link included in the lower hierarchical level road network data is a link existing also on the upper hierarchical level road network data, and second correspondence data indicating that a node included in the lower hierarchical level road network data is a common node which exists also in the upper hierarchical level road network data, wherein said second step selects the node located on said upper hierarchical level existing link on the basis of said first correspondence data, and said third step performs an external search in an extended search area by using the upper hierarchical level existing link until a common node specified by said second correspondence data is found for each node selected in said second step to obtain the arrival cost to each common node.

8. The route searching method according to claim 7, wherein said second step selects the node located on said upper hierarchical level existing link and located in the vicinity of said predetermined search area from among the nodes for which the minimum arrival costs have been obtained in said first step.

9. The route searching method according to claim 7, wherein said plurality of hierarchical road network data are divided into a plurality of units, each unit of said road network data records an adjacent node for indicating correspondence between connecting parts of adjacent units for a road divided at a connecting part between the adjacent units, said correspondence data further includes third correspondence data indicating the position on the corresponding upper hierarchical level existing link for said adjacent node located on said upper hierarchical level existing link, wherein said third step obtains the arrival cost to said common node on the basis of said third correspondence data when said adjacent node appears in said external search.

10. The route searching method according to claim 9, wherein said correspondence data further includes parent node data for specifying a node at an end of the corresponding upper hierarchical level existing link for said adjacent node located on said upper hierarchical level existing link.

11. The route searching method according to claim 1, wherein said correspondence data includes parent link data indicating a link on the upper hierarchical level road network data corresponding to a link included in the lower hierarchical level road network data, said second step selects the node located on said upper hierarchical level existing link on the basis of said parent link data, and said third step performs an external search in an extended search area using the upper hierarchical level existing link for each node selected in said second step to a node immediately before a change in said parent link data to obtain an arrival cost to each common node.

12. An apparatus for selecting an optimum route on a map using map data including a hierarchical structure of a plurality of road network data at different degrees of minuteness, comprising:

map data storing means for storing the map data including the plurality of hierarchical road network data, said plurality of road network data being hierarchically structured so that the degree of minuteness becomes lower from a lower hierarchical level to an upper hierarchical level;

correspondence data storing means for storing correspondence data showing correspondence between the road network data on the lower hierarchical level and the road network data on the upper hierarchical level;

first cost obtaining means for obtaining minimum arrival costs from a starting point of a search for individual nodes existing in a predetermined search area, the predetermined search area extending from the starting point of the search on the road network data on the lower hierarchical level, the cost including distance and/or travel time;

node selecting means for selecting a node located on an upper hierarchical level existing link, which is a link existing in the upper hierarchical level road network data, from among the nodes for which the minimum arrival costs have been obtained by said first cost obtaining means on the basis of said correspondence data;

second cost obtaining means for obtaining an arrival cost to a node in common with the upper hierarchical level which first appears when following said upper hierarchical level existing link on the basis of said correspondence data for each node selected by said node selecting means; and third cost obtaining means for obtaining a minimum arrival cost from the search starting point to each common node on the basis of the minimum arrival cost obtained by said first cost obtaining means and the arrival cost obtained by said second cost obtaining means;

wherein the optimum route is newly searched for on the road network data on the upper hierarchical level using the minimum arrival costs to individual common nodes obtained by said third cost obtaining means as initial conditions.

* * * * *